(12) United States Patent
Maxey et al.

(10) Patent No.: US 10,006,665 B2
(45) Date of Patent: Jun. 26, 2018

(54) SOLAR TRACKER DRIVE

(71) Applicant: SunPower Corporation, San Jose, CA (US)

(72) Inventors: Jason Ray Maxey, Pinole, CA (US); Shawn Joseph Mercy, Albany, CA (US); Zachary S. Judkins, Berkeley, CA (US)

(73) Assignee: SunPower Corporation, San Jose, CA (US)

( * ) Notice: Subject to any disclaimer, the term of this patent is extended or adjusted under 35 U.S.C. 154(b) by 994 days.

(21) Appl. No.: 14/317,548

(22) Filed: Jun. 27, 2014

(65) Prior Publication Data

US 2015/0377518 A1    Dec. 31, 2015

(51) Int. Cl.
*F24J 2/38* (2014.01)
*F24J 2/54* (2006.01)
*F24J 2/46* (2006.01)
*F24J 2/00* (2014.01)

(52) U.S. Cl.
CPC .............. *F24J 2/38* (2013.01); *F24J 2/4636* (2013.01); *F24J 2/541* (2013.01); *F24J 2002/0084* (2013.01); *F24J 2002/5468* (2013.01); *Y02E 10/47* (2013.01)

(58) Field of Classification Search
CPC .... F24J 2/38; F24J 2/541; F24J 2/4636; F24J 2002/5468; F24J 2002/0084
See application file for complete search history.

(56) References Cited

U.S. PATENT DOCUMENTS

| | | |
|---|---|---|
| 8,604,404 B1 | 12/2013 | Linderman |
| 2010/0175741 A1 | 7/2010 | Thorne |
| 2012/0024340 A1* | 2/2012 | Eberspacher ... H01L 31/022425 136/244 |
| 2012/0266938 A1 | 10/2012 | Goei |
| 2013/0048049 A1 | 2/2013 | Flannery |
| 2013/0146124 A1 | 6/2013 | McClure et al. |
| 2013/0257155 A1* | 10/2013 | Judkins ................... H02S 50/00 307/43 |

OTHER PUBLICATIONS

Search Report and Written Opinion issued in International Application No. PCT/US/033916 dated Aug. 27, 2015.

* cited by examiner

*Primary Examiner* — Avinash Savani
*Assistant Examiner* — Rabeeul Zuberi
(74) *Attorney, Agent, or Firm* — Oblon, McClelland, Maier & Neustadt, L.L.P.

(57) ABSTRACT

A sun-tracking solar drive can include hardware and/or be operated in accordance with a method in which angular deviations are compensated for operation including during forward tracking and backtracking. For example, the effects of thermal expansion and mechanical slop associated with certain components can be calculated and used for calculation of target angles that can provide for increased power output and improved shading avoidance.

10 Claims, 16 Drawing Sheets

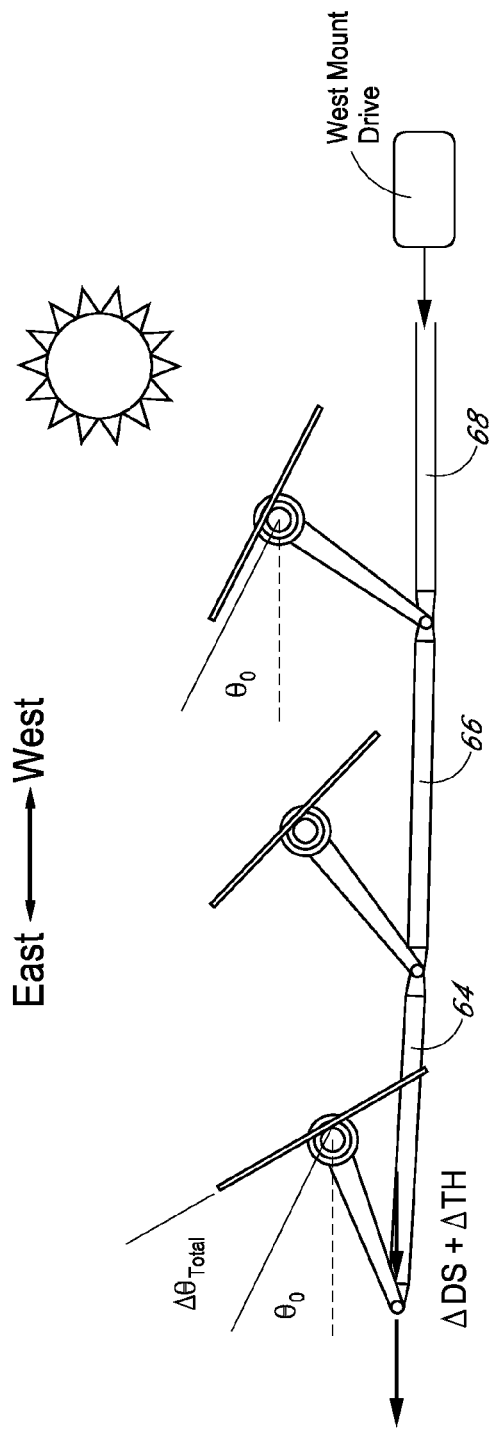
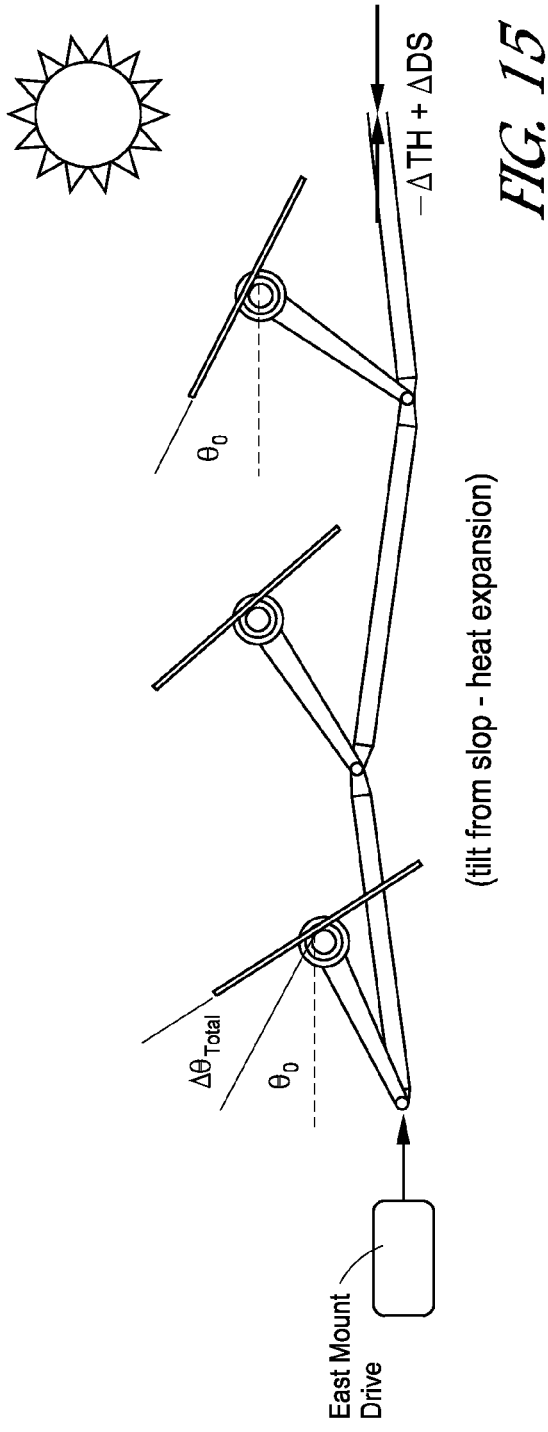

SOLAR TRACKER DRIVE

TECHNICAL FIELD

Embodiments of the subject matter described herein relate generally to solar energy systems which include drive systems for sun-tracking, solar energy collecting devices.

BACKGROUND

Some larger solar collector installations include arrays of sun-tracking, solar power collector assemblies. Such assemblies can be used in conjunction with photovoltaic modules, concentrated photovoltaic modules, as well as concentrated thermal solar collector devices.

Sun-tracking solar energy systems include hardware for automatically adjusting the position of the collector devices to track the sun as it moves across the sky. Some known systems include parallel rows of solar energy collection devices supported on pivoting shafts, known as "torque tubes." The torque tubes are pivoted to tilt the solar energy collection devices so as to track the movement of the sun.

Further, some systems (a.k.a. "ganged" systems) include a reduced number of drive devices, for example, where each drive device is connected to a plurality of parallel torque tubes. Such systems can benefit from the cost reduction of using fewer drives, which can include expensive electric motors, control circuitry, and other hardware.

BRIEF SUMMARY

An aspect of at least one of the inventions disclosed herein includes the realization that some types of solar tracking systems, such as those including a plurality of parallel rows of solar energy collectors driven with a common drive, can be subject to detrimental effects on power output caused by unintended behaviors of certain components. Additionally, in some cases, some behaviors can be additive or subtractive.

For example, "ganged" sun-tracking solar power systems include a series of drive links extending from a drive actuator, to pivoting connections at each of a number of parallel torque tubes. Such pivoting connections can include bearings or simple pin-hole connections. Such connections are also connected to a torque arm associated with each torque tube. Thus, as the drive links are moved by the drive actuator, the torque tubes are pivoted. However, it has been discovered that the relatively small amounts of known mechanical slop at each of these connections can have a cumulative effect generating a significant differences in the magnitudes of angular movement of the parallel torque tubes.

For example, some known solar power systems which have 18 parallel torque tubes can generate an offset between the first torque tube and the 18th torque tube that is substantial enough to cause detrimental effects on power output of the system. During some periods of operation, the angular deviations are equal to the sum all of the mechanical slop in each of the 18 connections between the drive links and torque arms. Additionally, an aspect of at least one of the inventions disclosed herein includes the realization that such accumulated angular offsets caused by mechanical slop can accumulate in an additive manner during one part of the day and a subtractive manner during a different part of the day.

Another aspect of at least one of the inventions disclosed herein includes the realization that additional angular offsets can be caused by thermal expansion of the links connecting parallel torque tubes. Similarly to the effects of mechanical slop noted above, a thermal expansion of each of the drive links can produce different angular offsets at each of the torque tubes due to a cumulative effect of thermal expansion. Additionally, another aspect of at least one of the inventions disclosed herein includes the realization that such effects of thermal expansion can have additive or subtractive effects on the causes of other angular offsets, such as mechanical slop discussed above. Such angular offsets can reduce the power output from such a solar system by causing solar energy collectors to be tilted at unintended angles, which may be less than optimum for maximum power generation.

Additionally, another aspect of at least one of the inventions disclosed herein includes the realization that unintended angular offsets, such as those noted above, can negatively impact the accuracy of the timing at which such a solar system changes between forward tracking and backtracking.

"Forward tracking" or "normal" tracking of a sun-tracking solar system can be considered as an operation of a solar system during normal tracking of the movement of the sun across the sky. For example, during forward tracking, a sun-tracking system tilts solar energy collectors so as to maintain an orientation as close as possible to perpendicular to incoming sunlight, following the sun as it moves across the sky. However, during a portion of every morning and every evening, such a normal forward tracking operation would result in shadows being cast by more sunward solar energy collectors on to adjacent rows of solar energy collectors. The time of day at which such shadowing begins depends on the path of the sun and the spacing of the parallel rows of solar energy collectors.

Thus, for example, at the beginning of a day, as the sun rises over the horizon, a sun-tracking solar energy system such as that described above would be programmed to maintain the solar energy collectors, such as photovoltaic modules, in an approximately horizontal position. Initially, sunlight will approach such photovoltaic modules in a direction nearly parallel with the upper surface of the photovoltaic modules.

As the sun further rises through the morning, the photovoltaic modules would be gradually tilted toward the rising sun, in a direction opposite to the direction of the movement of the rising sun. This movement, known as "backtracking", is opposite to the direction of the sunrise, but tilts the photovoltaic modules as close as possible to an orientation perpendicular to the sunlight, without shading adjacent rows.

Eventually, the sun reaches a position at which the photovoltaic modules cannot cast shadows on adjacent rows of photovoltaic modules. At that point, "normal" or "forward tracking" would begin.

At some point in the afternoon, as the sun sets, the sunward photovoltaic modules would begin to cast shadows on adjacent rows, and a similar backtracking movement would be used until sunset. As noted above, the timing at which shadowing, and thus backtracking, begins and ends is controlled by the spacing and size of the photovoltaic modules, which does not change for a given installation, and the movement of the sun, which follows a highly predictable pattern.

As aspect of at least one of the inventions disclosed herein includes the realization that unintended angular offsets, such as those noted above caused by mechanical slop and thermal expansion, can unexpectedly change the timing of when shadowing begins or ends. Additionally, angular offsets of the parallel rows of solar collectors caused by mechanical slop and thermal expansion do not vary uniformly over time; mechanical slop generally increasing in magnitude over time and thermal expansion being driven by ambient temperature changes.

A further aspect of at least one of the inventions disclosed herein includes the realization that the output of some known systems can be improved by tilting solar energy collection devices in a manner that compensates for angular offsets, some of which may be dynamic, i.e., changing gradually over time or more arbitrarily.

Thus, in some embodiments, a solar energy collection system can comprise a first array of solar energy collection devices mounted so as to be moveable between first and second positions. A second array of solar energy collection devices can be spaced from a first array and mounted so as to be moveable between first and second positions, wherein in the first position, the first and second arrays face more towards a westerly direction, and wherein in the second position, the first and second arrays face more towards an easterly direction. A drive system can comprise a drive actuator, a first drive link connecting the actuator with the first array and a second drive link connecting the actuator with the second array, wherein the first and second drive links have different defective overall links. At least a first angle sensor can be configured to detect a first operational parameter of the solar energy collection system, the first operational parameter being an angle of orientation of at least a first portion of the solar energy collection system which changes as the first and second arrays move between the first and second positions and can be configured to output a first signal indicative of the detected angle of orientation. At least a second sensor can be configured to detect a second operational parameter of the solar energy collection system and to output a second signal indicative of a value of the detected second operational parameter. A controller can be connected to the drive system and the first and second sensors. The controller can be configured to drive the actuator based on the output of both the first and second sensors.

In some embodiments, a method of operating a solar energy collection system can be applied to a system including at least first and second arrays of solar collection devices which are tilted to track movement of the sun with a common tilts drive device. The tilts drive device can be connected to the first array with a first linkage assembly and the tilts drive can be connected to the second array with a second linkage assembly, wherein the first and second linkage assemblies have different overall links. The method can also include detecting a first operational parameter of the solar energy collection system, where the first operational parameter is a first angle of inclination of the first array of solar collection devices. The method can also include detecting a second operational parameter of the solar energy collection system. The method can also include operating the tilts drive device to tilt the first and second arrays to track movement of the sun based on the detected first and second operational parameters.

In some embodiments, a solar energy collection system can include a first array of solar energy collection devices mounted so as to be tiltable about a first tilt axis between the first and second positions. A second array of solar energy collection devices can be mounted so as to be tiltable about a second tilt axis between the first and second positions, wherein the first tilt axis is spaced from the second tilt axis along an east-west direction, and wherein in the first position, the first and second array is faced more towards a westerly direction, and wherein in the second position, the first and second array is faced more towards an easterly direction. A drive system can include a drive actuator, a first drive link connecting the actuator with the first array and a second drive link connecting the actuator with the second array. A controller can be connected to the drive system and the first and second sensors. The controller can compensate for differences and thermal expansion of the first and second drive links and drive the actuator based on the compensation.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 14 is a schematic elevational view of three rows of the system of FIG. 4 illustrating effects of thermal expansion in an afternoon orientation and an additive effect with angular offset caused by mechanical slop;

FIG. 15 is a schematic elevational view of the system of FIG. 14 which includes an east side mounted drive and illustrating a subtractive effect of thermal expansion with mechanical slop during an afternoon orientation;

DETAILED DESCRIPTION

Figure 1:
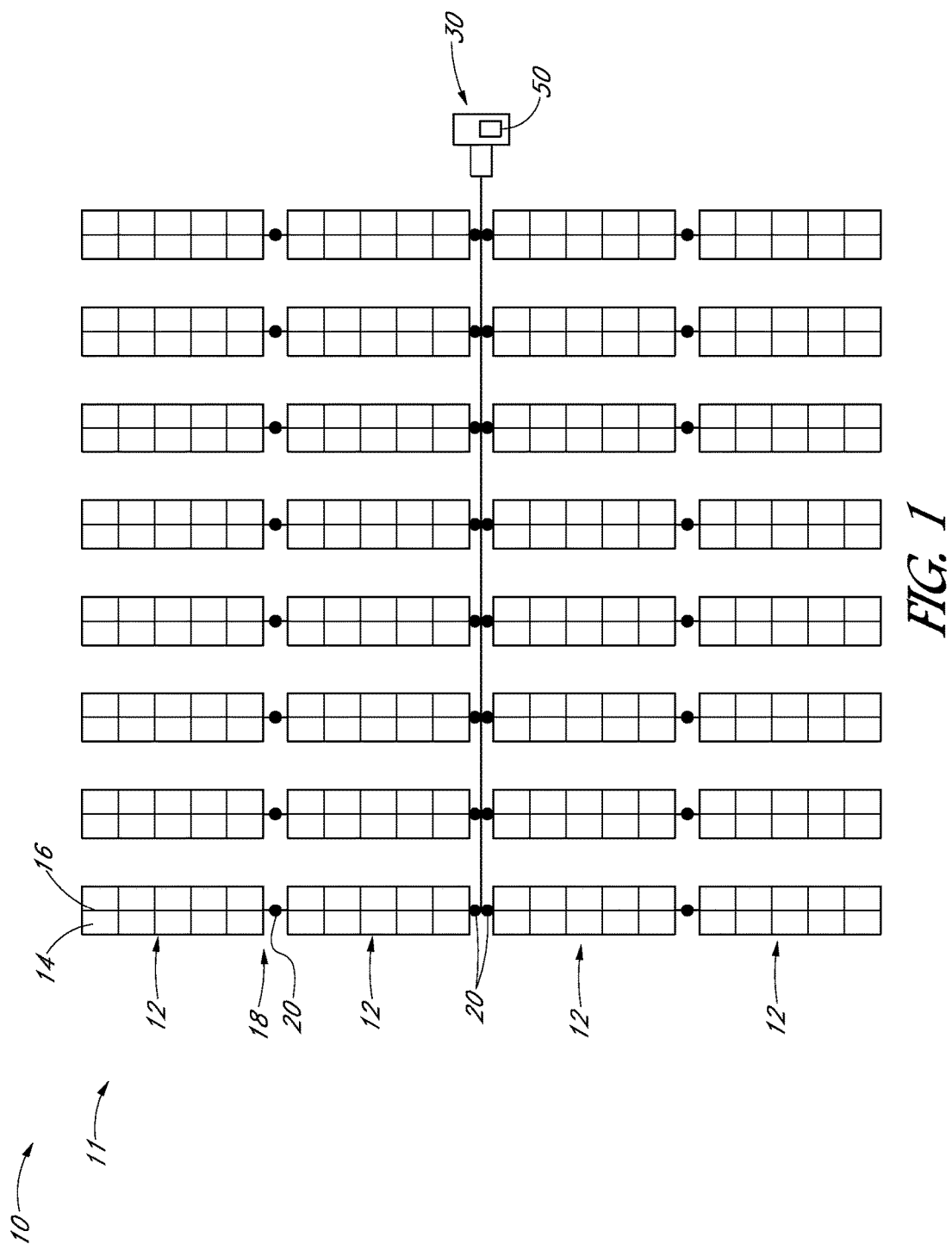
FIG. 1 is a schematic top plan view of a solar collector system including a sun-tracking drive in accordance with an embodiment.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units or components may be described or claimed as "configured to" perform a task or tasks. In such contexts, the phrase "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112, sixth paragraph, for that unit/component.

"First," "Second," etc. as used herein, these terms are used as arbitrary labels for nouns that they precede, and do not imply any type of ordering (e.g., spatial, temporal, logical, etc.). For example, reference to a "first" solar module does not necessarily imply that this solar module is the first solar module in a sequence; instead the term "first" is used to differentiate this solar module from another solar module (e.g., a "second" solar module).

As used herein, the term "based on" describes one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The following description refers to elements, nodes, or features being "coupled" together. As used herein, unless expressly stated otherwise, "coupled" means that one element/node/feature is directly or indirectly joined to (or directly or indirectly communicates with) another element/node/feature.

Some elements, components, and/or features are described as being adjustable or adjusted. As used herein, unless expressly stated otherwise, "adjust" means to position, modify, alter, or dispose an element or component or portion thereof as suitable to the circumstance and embodiment. In certain cases, the element or component, or portion thereof, can remain in an unchanged position, state, and/or condition as a result of adjustment, if appropriate or desirable for the embodiment under the circumstances. In some cases, the element or component can be altered, changed, or modified to a new position, state, and/or condition as a result of adjustment, if appropriate or desired In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", and "side" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

The inventions disclosed herein are described in the context of non-concentrated photovoltaic arrays and modules. However, these inventions can be used in other contexts as well, such as concentrated photovoltaic systems, thermal solar systems, concentrated thermal solar systems, etc.

In the description set forth below, a solar energy collection system 10 is described in the context of a plurality of solar collection modules, supported so as to be pivotally adjustable for sun-tracking purposes. Each of the modules can include a support member supporting a plurality of solar collection devices as well as wiring for connecting the various solar collection devices to each other and to other modules. The system 10 can also include devices and/or functionality for reducing or eliminating negative effects on total power production caused by, for example, unintended offsets of the angular orientation of the solar collection modules. For example, the solar collection system 10 of FIG. 1 can include a controller 50 and/or other devices or functionality which can serve as means for compensating for angular offsets of the orientation of the solar collection modules, during sun-tracking operations, including those offsets caused by differences in thermal expansion and/or mechanical slop of components of the system 10, as well as other sources of such angular offsets.

FIG. 1 illustrates the solar collection system 10, which can be considered an electricity farm. The solar collection system 10 includes a solar collector array 11 which includes a plurality of solar collection modules 12. Each of the solar collection modules 12 can include a plurality of solar collecting devices 14 (e.g., solar cells) incorporated into a laminate and encircled by a peripheral frame, the module 12 supported by a drive shaft or torque tube 16. Each of the torque tubes 16 are supported above the ground by a support assembly 18. Each of the support assemblies 18 can include a pile and a bearing assembly 20.

With continued reference to FIG. 1, the system 10 can also include a tracking drive 30 connected to the torque tube 16 and configured to pivot the torque tube 16 so as to cause the collector devices 14 to track the movement of the sun. In the illustrated embodiment, the torque tubes 16 are arranged generally horizontally and the modules 12 can be connected to each other and the torque tubes 16, as more fully described in U.S. patent application Ser. No. 13/176,276, filed Jul. 5, 2011, the entire contents of which is hereby expressly incorporated by reference. However, inventions disclosed herein can be used in the context of other types of arrangements. For example, the system 10 can include a plurality of modules 12 that are arranged such that the torque tubes 16 are inclined relative to horizontal, wherein the torque tubes 16 are not connected in an end to end fashion, such as the arrangement illustrated and disclosed in U.S. Patent Publication No. 2008/0245360. The entire contents of the 2008/0245360 patent publication, as well as the entire contents of the U.S. patent application Ser. No. 13/631,782 are hereby expressly incorporated by reference. Further, the inventions disclosed herein can be used in conjunction with the systems that provide for controlled tilting about two axes, although not illustrated herein.

Additionally, the solar collection devices 14 can be in the form of photovoltaic modules, thermal solar collection devices, concentrated photovoltaic devices, or concentrated thermal solar collection devices. In the illustrated embodiment, the solar collection devices 14 are in the form of non-concentrated photovoltaic modules 12.

Figure 2:
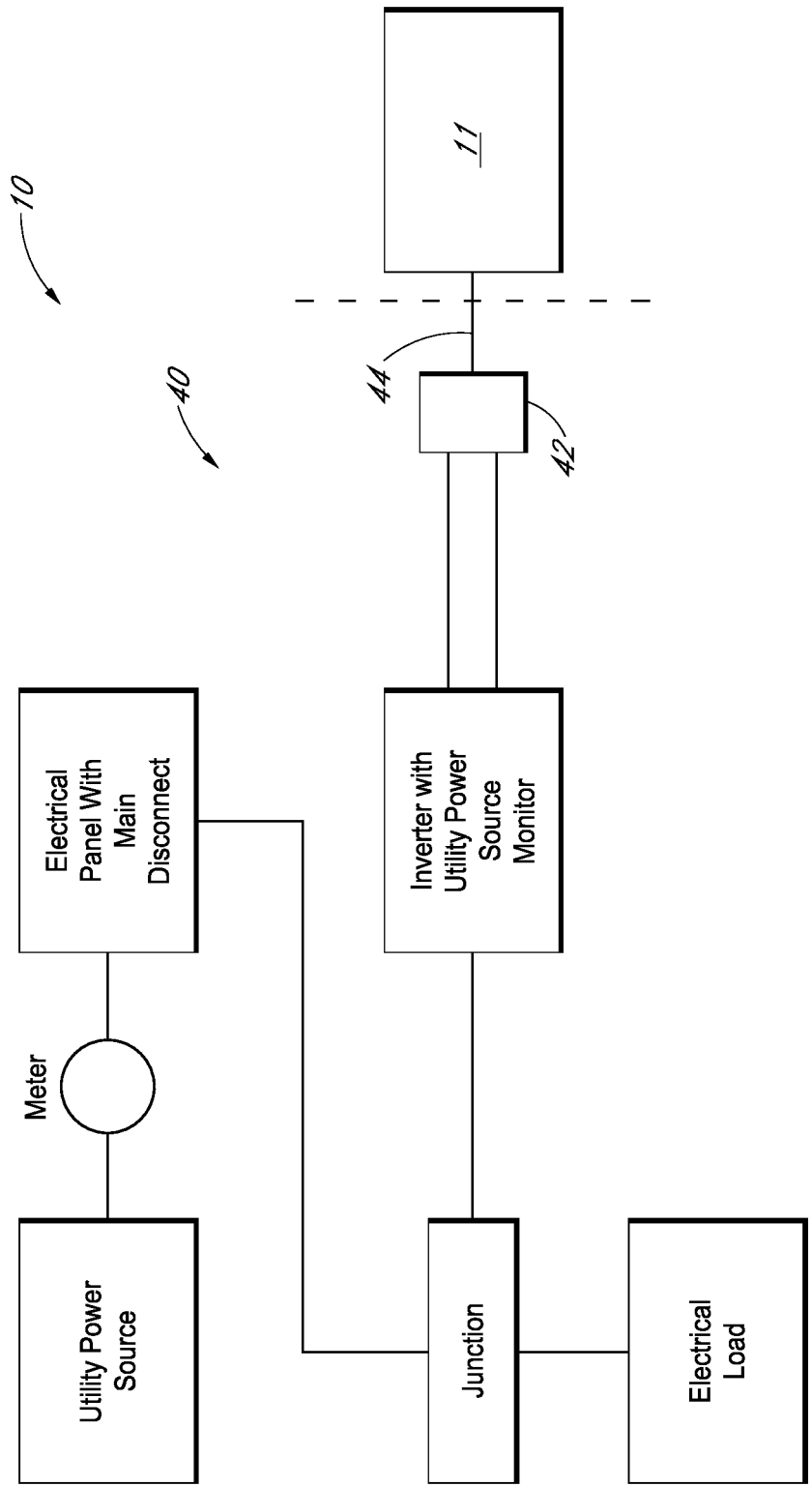
FIG. 2 is a schematic diagram of the system illustrated in FIG. 1 illustrating optional electrical connections of the collector system with various electrical components.

With reference to FIG. 2, solar collection system 10 can further include an electrical system 40 connected to the array 11. For example, the electrical system 40 can include the array 11 as a power source connected to a remote connection device 42 with power lines 44. The electrical system 40 can also include a utility power source, a meter, an electrical panel with a main disconnect, a junction, electrical loads, and/or an inverter with the utility power source monitor. The electrical system 40 can be configured and can operate in accordance with the descriptions set forth in U.S. Patent Publication No. 2010/0071744, the entire contents of which is hereby expressly incorporated by reference.

Figure 3:
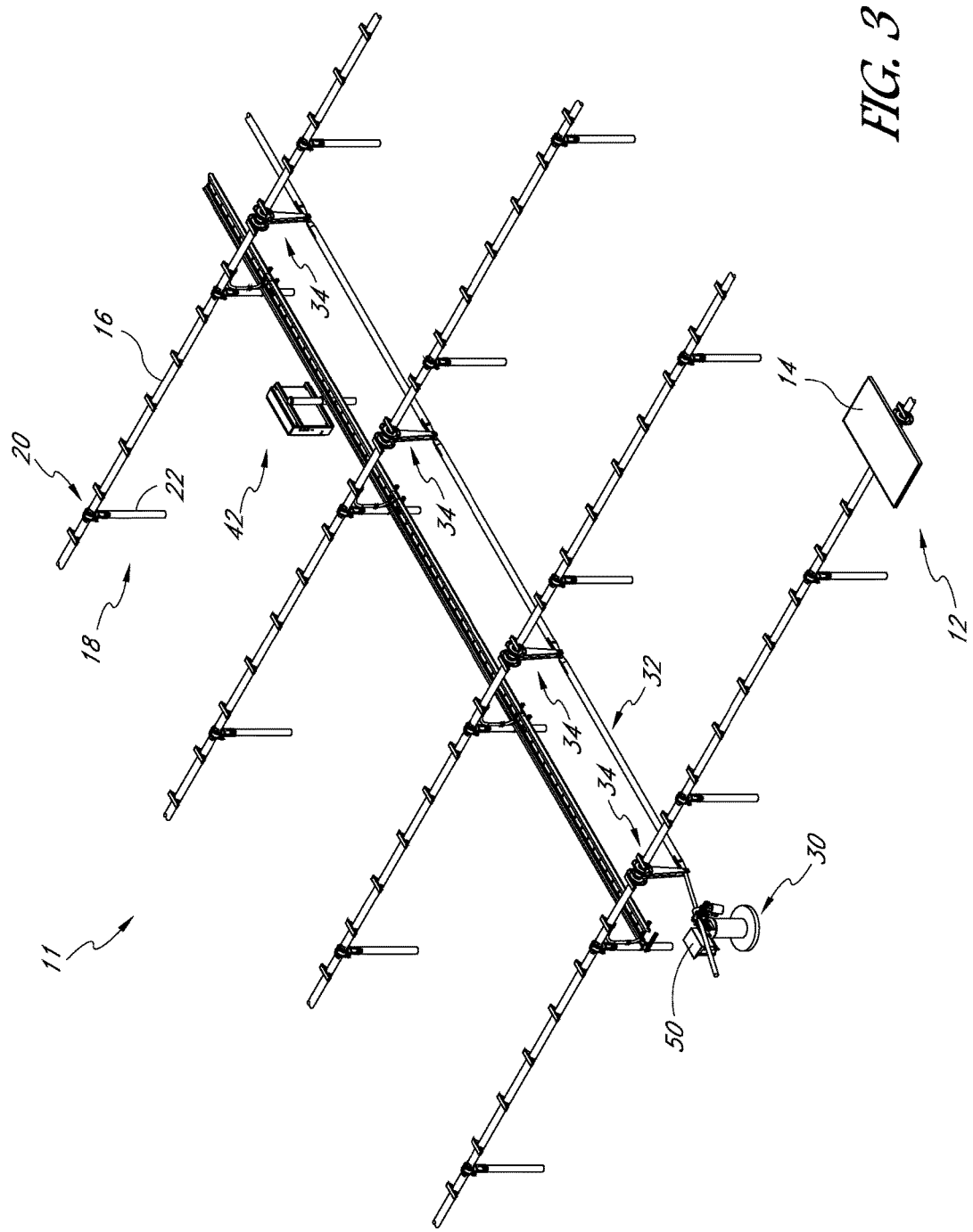
FIG. 3 is a perspective view of the solar collection system of FIG. 1, illustrating a plurality of piles mounted to the ground and supporting a plurality of torque tubes with a sun-tracking drive in accordance with an embodiment.

FIG. 3 illustrates the array 11 with all but one of the solar collection devices 14 removed. As shown in FIG. 3, each of the support assemblies 18 includes the bearing 20 supported at the upper end of a pile 22. The torque tube 16 can be of any length and can be formed in one or more pieces. The spacing of the piles 22 relative to one another, can be determined based on the desired limits on deflection of the torque tubes 16 between the support structures 18, wind loads, shading, and other factors. The spacing of the piles 22 also controls the spacing of the torque tubes 16 and the spacing of the modules 12. The ratio of the total area of all of the upper surfaces of the modules 12 (when in a "noon" position) divided by the total area occupied by the modules 12 (including all of the gaps) is known as the "Ground Coverage Ratio" (GCR). Larger gaps between the modules 14 result in a lower GCR, but also reduce inter-row shading and thus reduce the amount of time during which backtracking is needed to avoid inter-row shading.

The tilt drive 30 can include a drive strut 32 coupled with the torque tube 16 in a way that pivots the torque tube 16 as the drive strut 32 is moved axially along its length. The drive strut 32 can be connected with the torque tube 16 with torque arm assemblies 34. In the illustrated embodiment, the torque arm assemblies 34 disposed at an end of each of the torque tube 16. Additionally, the array 11 can include an electrical wire tray 60 supported by one or more of the piles 22, or by other means.

Figure 4:
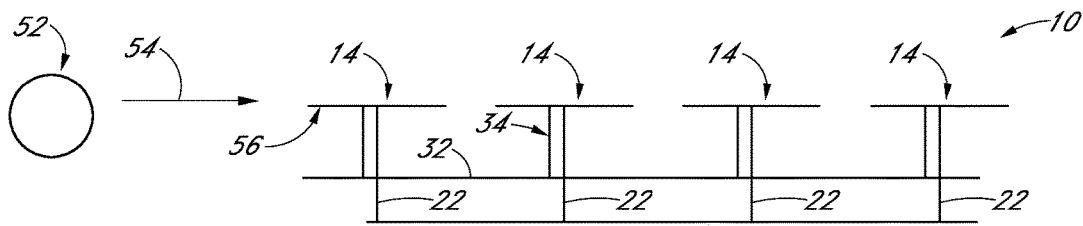
FIG. 4 is a schematic, southerly facing, elevational view of four rows of a sun-tracking solar collection system in which the four rows are tilted with a common drive.

FIGS. 4-8 schematically illustrate sun-tracking movements of the modules 12 over the course of the daylight portion of one day. Specifically, FIG. 4 illustrates the system 10 oriented in a "noon" position. However, as shown in FIG. 4, the sun 52 is on the eastward horizon, i.e., sunrise. As the sun rises, sunlight 54 from the sun 52 approaches the modules 12 along a direction essentially parallel to the upper surfaces of the modules 12. The modules 12, however, are maintained in a direction pointing directly upward ("noon"), so as to avoid the eastward module 56 from casting a shadow on the adjacent, westward positioned modules 12.

Figure 5:
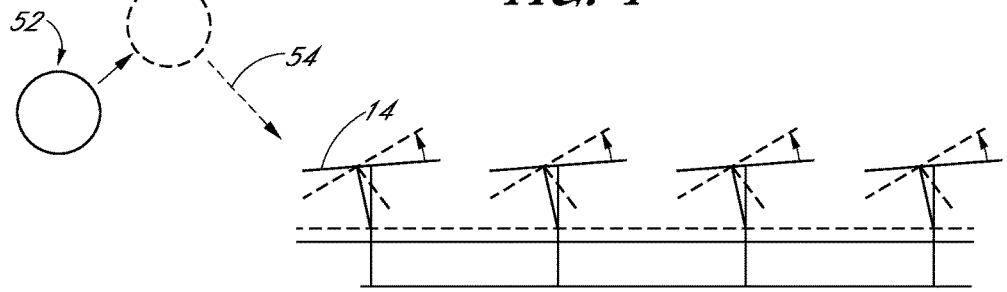
FIG. 5 is a schematic view of the system of FIG. 4, illustrating a backtracking movement of the system as the sun rises, the initial position indicated in solid line, a subsequent position illustrated in dotted line.

With reference to FIG. 5, as the sun 52 rises from the sunrise position illustrated in solid line to a position later in the morning, illustrated in dash line, the controller 50 operates the drive 30 to tilt the modules 12 in a backtracking motion. Specifically, during a backtracking motion in the morning, the modules 12 are gradually tilted eastwardly, as the sun 52 rises along a westerly trajectory.

The controller 50 performs calculations for controlling the drive 30 so as to orient the modules 12 as closely as possible to an orientation perpendicular to the sunlight 54, without casting a shadow on adjacent modules 12. In other words, the controller 50 causes the modules 12 to rotate through a range of non-optimal orientations, which produces less power than a perpendicular orientation, so as to avoid casting shadows which have a greater detrimental effect on total power output of the system 10.

Figure 6:
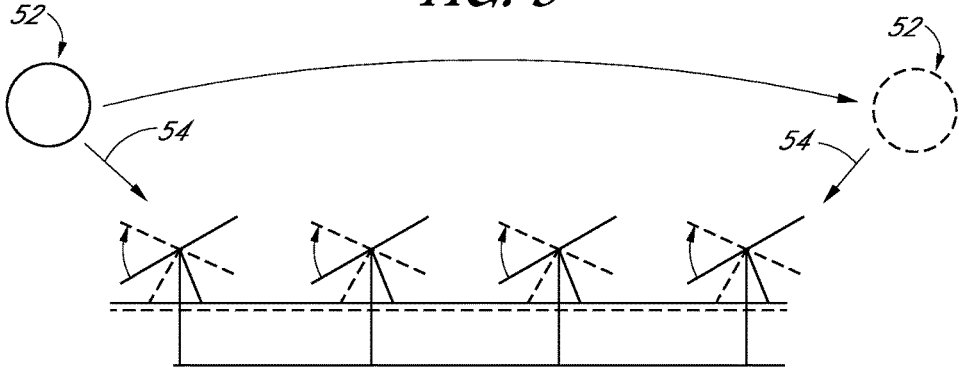
FIG. 6 is a schematic elevational view of the system of FIG. 5, illustrating a forward tracking movement of the system during mid-day.

With reference to FIG. 6, as the sun 52 moves to a position at which shadows can no longer be cast by any of the modules 12 onto an adjacent module 14, the modules 12 are tilted through a forward tracking movement, following the movement of the sun 52 such that the modules 12 face a direction as close as possible to perpendicular to sunlight 54 from the sun 52.

Figure 7:
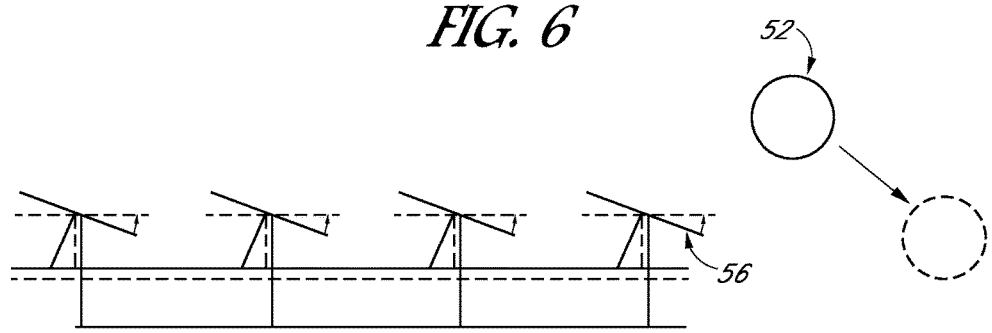
FIG. 7 is a schematic elevational view of the system of FIG. 6, illustrating a backtracking movement during a portion of the evening.
Figure 8:
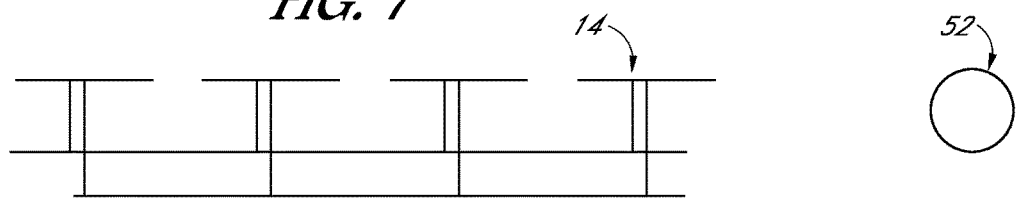
FIG. 8 is a schematic elevational view of the system of FIG. 7, at sunset.

With reference to FIG. 7, as the sun 52 continues to move across the sky, it eventually reaches a position, illustrated in FIG. 7, at which the westward modules, for example, module 56, begins or will begin to cast shadows on the adjacent modules 12 positioned to the east. Thus, the controller 50 controls the modules 12 to tilt through a backtracking movement, like that described above with reference to FIG. 5. By the time of sunset, as illustrated in FIG. 8, the modules 12 are eventually tilted to a horizontal or "noon" position.

Figure 9:
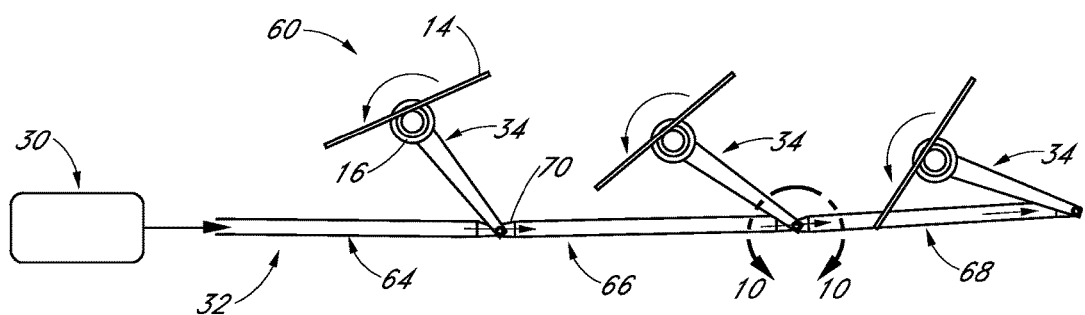
FIG. 9 is a schematic elevational view of three rows of the system of FIG. 4 with arrows indicating gravity generated torques on the torque tubes of each row when the solar devices are in a before-noon orientation, and with exaggerated angular offsets.
Figure 11:
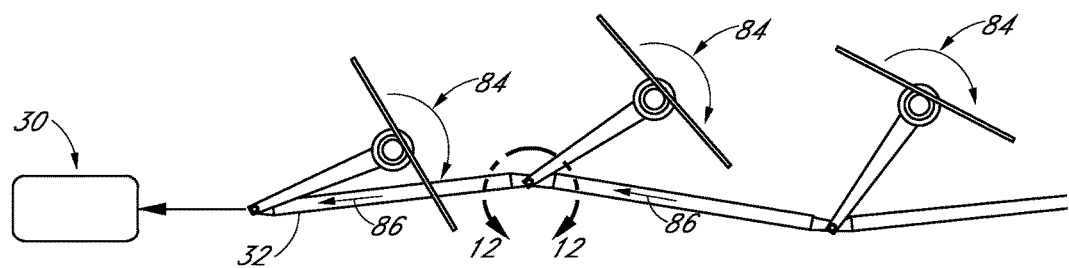
FIG. 11 is a schematic elevational view of the system in FIG. 9 indicating gravity generated torques on the torque tubes generated during "afternoon" sun-tracking orientations.
Figure 12:
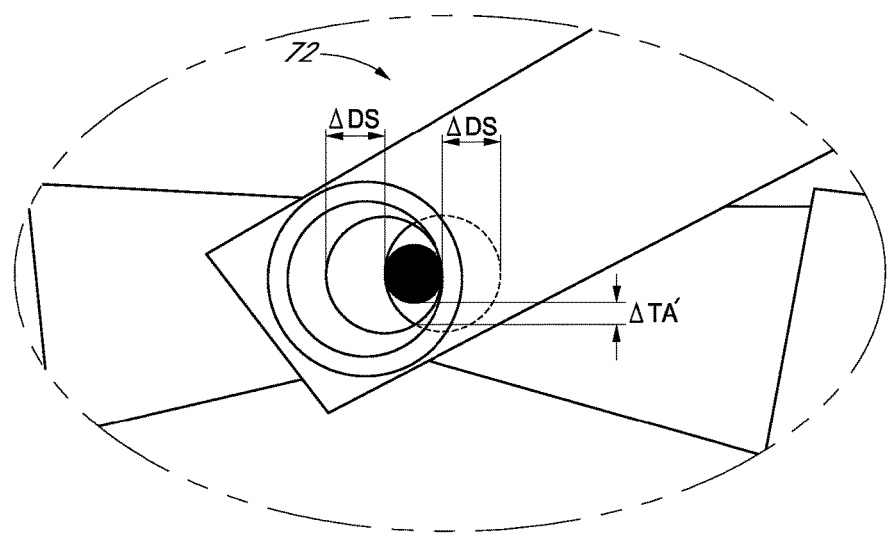
FIG. 12 is an enlarged elevational view of a connection between drive links and a torque arm illustrated in FIG. 11.

With reference to FIGS. 9 and 11, while the modules 12 are tilted in before noon orientations (i.e., all positions when modules 12 are tilted eastwardly relative to a "noon" position) and afternoon orientations (i.e., all positions when modules 12 are tilted westwardly relative to a "noon" position), gravity generates some torque on the torque tubes 16 which is transferred to the torque arms 34. The gravity-induced torque, illustrated as arrows 60, is caused by the position of the center of gravity 62 (FIG. 13) of the array, which tends to be above the pivot axis of the torque tube 16, during before-noon positions of the modules 12.

With continued reference to FIG. 9, the torque 60 generated during before-noon orientations of the modules 12, is transferred through the torque arm 34 to the drive strut 32. The drive strut 32 can comprise a plurality of link members 64, 66, 68, connected in an end-to-end fashion and additionally connected to an end of the torque arm 34. The torque 60 thus generates tension forces 70 in the drive link, in systems 10 in which the drive 30 is disposed on the east side of the system 10 and thus resisting tension forces 70 in the drive struts 32.

Figure 10:
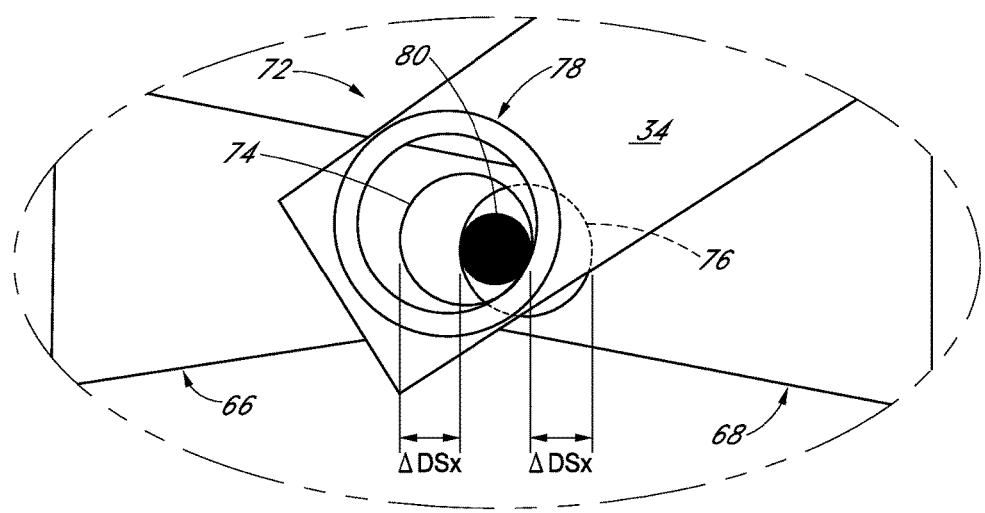
FIG. 10 is an enlarged elevational view of a connection between drive links and a torque arm of FIG. 9.

FIG. 10 is a schematic enlargement of a connection between the link member 66 and 68. The connection 72 is a pin-hole connection, however, other connections can also be used. The connection 72 includes a hole 74 formed at the end of the link member 66, a hole 76 formed at the end of the link member 68, and a hole 78 formed at the lower end of the torque arm 34. A pin 80 extends through all three of the holes 74, 76, 78 so as to join the link member 66, 68, and the torque arm 34 and allowing freely pivoting movement.

The connection 72 includes some mechanical "slop," as do many types of mechanical pivoting connections. When in the orientation of FIG. 9, in which the drive 30 is positioned on an easterly side of the system 10, tension is generated along the link member 32, thereby causing the holes 74, 76 to squeeze the pin 80 in a manner in which all of the mechanical slop of the connection 72 is absorbed so as to effectively lengthen the drive strut 32. Additionally, the slop at each connection is cumulative on the overall effective length of the drive strut 32, thereby causing increasing angular deviations of each of the modules 12 along the westerly direction. With regard to the effective length of the drive links connecting the rows of modules with the drive 30, a first drive link can be the drive link 64 connecting the drive 30 with the first row (left-most row in FIG. 9) and a second drive link connecting the drive 30 with the westward adjacent row of modules 12 can include the drive links 64 and 66. Thus the first and second drive links have different overall effective lengths and different numbers of connections 72 which contribute to angular offsets.

FIG. 11 illustrates the system 10 with the modules 12 oriented in an afternoon position, which generates torques 84 in a manner similar to that described above with reference to the torques 60. Because the drive 30 is oriented on the east side of the system 10, the torques 84 generate compressive forces 86 on the link members 64, 66, 68. These compressive forces 86 cause the holes 74, 76 to move toward each other, thereby absorbing the mechanical slop of the joint 72 in a manner which decreases the overall effective length of the drive strut 32. Additionally, the torques 84 can cause the torque arm 34 to apply a partially vertically upward force, thereby generating some displacement of the hole 78 upwardly.

Figure 13:
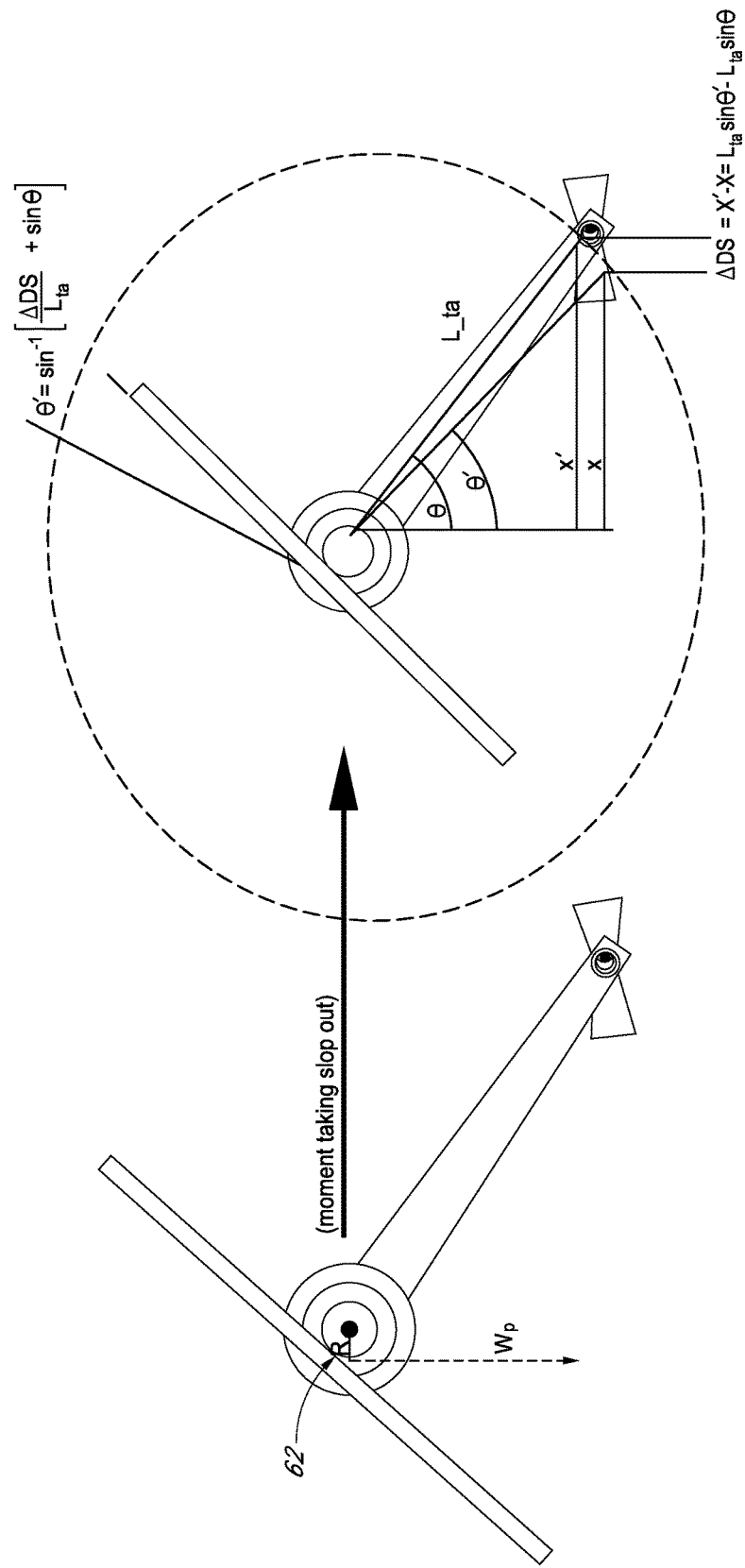
FIG. 13 is a schematic diagram illustrating the calculation of an angular offset caused by mechanical slop.

FIG. 13 illustrates parameters that can be used for calculating an angular offset θ' (an angular orientation of a module caused by a change in the effective length of one of the link members 64, 66, 68), based on the magnitude of mechanical slop ΔDS of the horizontal position of the lower end of the torque arm 34, resulting from mechanical slop noted above. The magnitude of ΔDS can be measured and stored in the controller 50, described below.

For example, with reference to FIG. 13, ΔDS is related to an angular offset θ' of one module as follows:

$$\Delta DS = X' - X = L_{ta} \sin\theta' - L_{ta} \sin\theta \qquad \text{Equation 1:}$$

where ΔDS is a measured magnitude of the horizontal offset of the end of the torque arm 34 due to mechanical slop in one connection 72, X is the expected horizontal component of the position of the lower end of the torque arm 34 relative to the axis or rotation of the torque tube 44, X' is the offset position of the horizontal component of the lower end of the torque arm 34 due to mechanical slop, and $L_{ta}$ is the length of the torque arm 34.

With continued reference to FIG. 13, a cumulative ΔDS produced at a chosen row that is the $n^{th}$ row from a reference row (e.g., a row with a detected orientation), is related to the θ' of the chosen row as follows:

$$\Delta DS_n = n \cdot (X' - X) = n \cdot (L_{ta} \sin\theta' - L_{ta} \sin\theta) \qquad \text{Equation 2:}$$

Thus, an angular offset θ' of a row, can be calculated as follows:

$$\theta' = \sin^{-1}\left[\frac{\Delta DS}{L_{ta}} + \sin\theta\right] \qquad \text{Equation 3}$$

FIG. 14 illustrates the resulting deformations and angular offsets produced by thermal expansion of the drive strut 32. Additionally, FIG. 14 illustrates the drive 30 positioned on a westward side of the system 10, for purposes of illustrating the additive effect of thermal expansion with the mechanical slop described above.

With continued reference to FIGS. 14 and 15, the thermal expansion of the drive strut 32 can be calculated using well-known formulas for thermal expansion, which provide precise mathematical measurements of changes in length of materials resulting from temperature changes, for example, from an initial temperature $T_i$ to a subsequent temperature $T_h$. FIG. 14 illustrates the solar collection modules 12 in an afternoon position so as to illustrate a typical scenario, when the ambient temperature rises from the morning initial temperature to a higher temperature in the afternoon, thereby generating a positive thermal expansion of the drive strut 32 and each of the associated link members 64, 66, 68.

The overall thermal expansion of the drive strut 32, or a portion thereof, corresponding to the accumulation of the expansions of each of the link members 64, 66, 68, can be calculated as follows:

$$\Delta TH = n \cdot [\alpha \cdot DS_0 (T_h - T_i)] \qquad \text{Equation 4:}$$

where n is the number of rows, α is the coefficient of thermal expansion of the material of which the link member 64, 66, 68 are made, $DS_0$ is the length of a link members 64, 66, 68, $T_h$ is an ambient temperature at the time of the calculation temperature and $T_i$ is an initial temperature, e.g., a temperature of the link members 64, 66, 68 when the $DS_0$ dimension was determined.

With continued reference to FIG. 14, with the drive 30 positioned on a westerly side of the system 10, and the modules 12 oriented in an afternoon orientation, the effects of positive thermal expansion and mechanical slop of the joints 72 combine in an additive manner, thereby generating a larger positive change in overall length of the drive strut 32. This is because with the drive 30 positioned on the westward side of the system 10, the gravity generated torques 80 generate tension forces in the drive strut 32, thereby combining the mechanical slop generated by the holes 74, 76 and increasing the overall length of the drive strut 32.

With reference to FIG. 15, if the drive 30 is positioned on the easterly side of the system 10, the effects of positive thermal expansion and mechanical slop operate in opposite directions and thereby combine in a subtractive manner. The chart set forth below includes indications of when thermal expansion and mechanical slop are additive or subtractive, based on the position of the drive 30 on the east or west side of the system 10, and when the modules 12 are in before-noon or afternoon positions.

|  | Before Noon | Afternoon |
|---|---|---|
| East Side Drive | Additive | Subtractive |
| West Side Drive | Subtractive | Additive |

The angular deviation caused by the sum of deviations of mechanical slop and thermal expansion can be calculated with the following formula:

$$\theta' = \sin^{-1}\left[\frac{\Delta DS + \Delta TH}{L_{ta}} + \sin\theta\right] \qquad \text{Equation 5}$$

Figure 16:
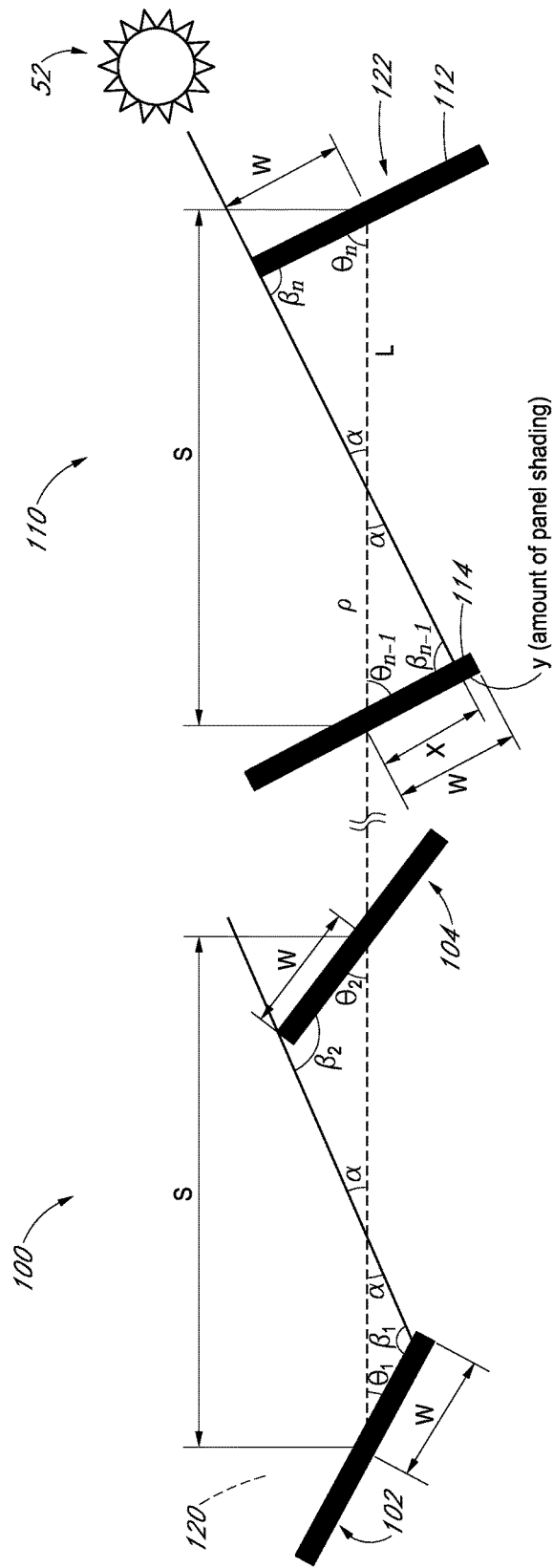
FIG. 16 is a schematic elevational view of the system of FIG. 4 tilted to an afternoon orientation and including reference variables for performing calculations described below.

FIG. 16 includes a schematic representation of an east-most pair 100 of the modules 12, including the east-most module 102 and an adjacent module 104 disposed on the westward side of module 102. Additionally, FIG. 16 illustrates a west-most pair 110 of modules 12 including the west-most module 112 and an adjacent module 114 disposed on the eastward side of module 112. The pairs 100, 110 are used for demonstrative purposes only, and such techniques can be used with other pairs as well.

In some embodiments of the system 10, an angle sensor 120 is configured to detect angular orientation of the module 102. For example, the angle sensor 120 can be attached to a portion of the module 102, the torque tube 60 supporting the module 102, another module 14 supported by the torque tube 60, or another location on the system 10 which moves in proportion to tilting movements of the module 102 with sufficient precision for the purposes described below. The angle sensor 120, thus, can be configured to detect an angular orientation of the module 102 and to output a signal indicative of the detected angle. Such sensors are well known in the art and commercially available. Similarly, the west-most pair 110 of the modules can also include an angle sensor 122, optionally.

In some embodiments, an angular orientation of an adjacent module, i.e., a module on an adjacent row of the system 10, can be calculated based on a detected angular orientation of a solar module on an adjacent row. For example, the sensor 120 can be used to detect an angular orientation of the module 102, and the angular orientation of the module 104 can be calculated, with the optional formulas, set forth below, or other formulas.

The following is an example of a calculation of an angular orientation of module 104 using detected orientations of an eastward, such as module 102 and a westward module such as module 112 (other modules can also be used), or a detected orientation of an actuator of drive 30 and a detected orientation of one of modules 102 and 112, or another module spaced away from the drive 30, or disposed on an opposite side of the system 10 from the drive 30, with reference to the variables included in FIG. 16:

$$\theta_n - 1 = \theta_n - (\theta_n - \theta_1)/(n-1) \qquad \text{Equation 6}$$

where n is the total number of rows, $\theta_1$ is an angle of one row, e.g., a detected angle of a first row, e.g., the row closest to the drive 30, $\theta_n$ is an angle of a row spaced from the first row, e.g., the nth row, which can be a detected angle.

Using this formula, the angular orientations of a series of adjacent rows of modules 12 can be calculated in a serial manner, based on the total angular deviation between the detected orientation of module 102 and the detected orientation of module 112, for example, an average of such deviation. Such a technique can be used where it is acceptable to assume that the angular deviations of the modules on the rows between module 102 and module 112 vary in a uniform manner.

The following is an example formula for calculation of angular orientation of a solar module based on a detected or calculated angular orientation of an adjacent solar module, based on detected angular orientations of two row of modules, and compensation for non-uniform angular deviations between the rows of modules. For example, dimensional differences, structural differences, material differences, etc., can cause the angles of the individual rows of modules to vary non-uniformly from the east side to the west side of the system. Such a formula can be expressed as follows:

$$\theta_n - 1 = \left(\theta n - \frac{\theta n - \theta 1}{n-1}\right) * Gn * Mn * H \qquad \text{Equation 7}$$

where $\theta 1$ and $\theta_n$ are known row angle values, and n is the total number of rows, $G_n$ is a non-uniformity linkage geometry factor, $M_n$ is a non-uniformity mechanical slop factor, and H is a non-uniformity heat expansion factor. These factors can be in the form of functions, a table of values correlated to groups or individual rows of the system 10, or other forms. For example, $G_n$ can be a factor that accounts for different lengths of torque arms 34 at each row, which can be caused by the use of different optional connector locations, or other factors that can affect the variation of the tilt angles of each row to deviate from the average deviation between rows calculated with Equation 7 above. Additionally, the $G_n$ factor can vary based on the angle of the associated rows. For example, the row-to-row angular deviation of the system 10 can be affected by the angular orientations of the drive links 32 and the torque arms 34, for example, based on the geometric relationship between the relative angular orientations between the drive links 32 and the torque arms 34 illustrated in FIGS. 13-16 and expressed in Equations 1-4.

Figure 16A:
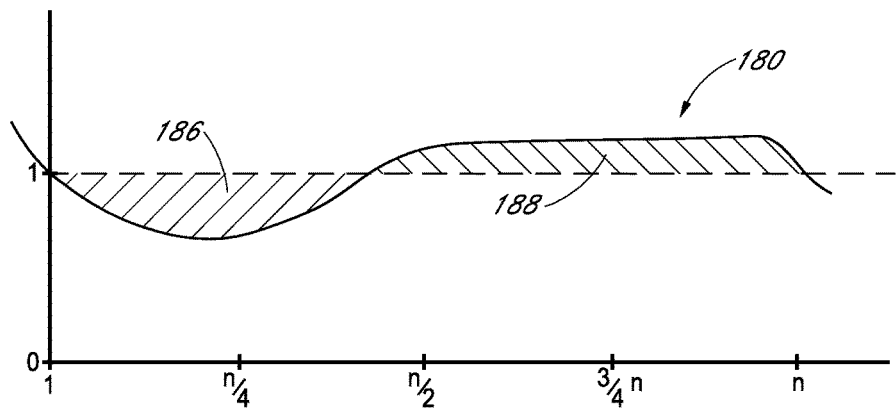
FIGS. 16A-16C are diagrams illustrating non-uniformity functions associated with angular offsets of rows of a sun-tracking solar collector system, such as the system of FIG. 1.
Figure 16B:
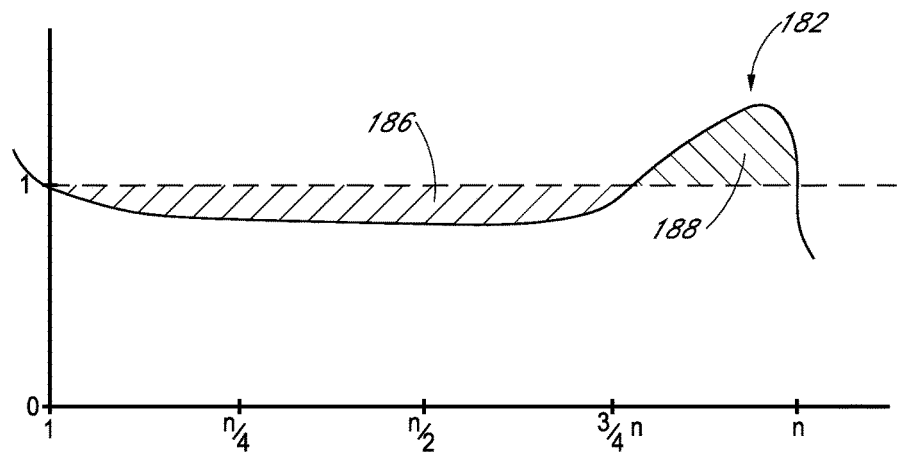
Figure 16C:
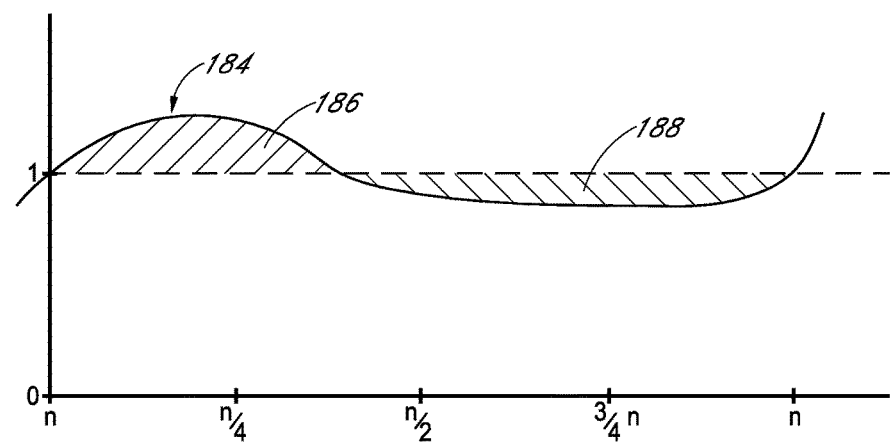

Optionally, compensation for only one of mechanical slop or thermal expansion can be used, by eliminating the associated mechanical slop $M_n$ or thermal expansion H factors from the above equation. Additionally, where the non-uniformity heat expansion factor H is used, the factor can be calculated based on a current temperature associated with the system 10, for example, a locally-reported ambient temperature (e.g., from a weather service), an ambient temperature detected in the vicinity of the system 10, within the system 10, on a surface of or inside a component of the system 10. Other temperatures can also be used. Optionally, one or all of the factors $G_n$, $M_n$, and/or H can be expressed as a function, for example, a polynomial function, or other function, that approximates the non-uniform variation of angular offsets of the rows of modules 12. For example, with reference to FIGS. 16A-16C, the resulting non-uniform offset functions 180, 182, 184, including any combination of the one or more factors $G_n$, $M_n$, and/or H can provide a non-uniformity weighting factor that compensates for the non-uniform variation of the angles of the rows of the system 10. Such wieighting factors can be considered as factors providing for variation of angles of each row from an average deviation of the rows, for example, calculated by Equation 6. Such functions 180, 182, 184, can vary between values less than 1 to values greater than 1. For example, the function 180, has a value of about 1 associated with rows 1 through row 3/8 n, then increases to values of greater than 1 for rows 3/8n to n. The function 180 defines an area 186 below 1 and an area 184 greater than 1, which are approximately equal as defined in units of area, (y-axis value× number of rows). FIGS. 16B and 16C illustrate functions 182 and 184 having other characteristic shapes, which can vary depending on angle of a detected row, such as angles θ1 and/or $\theta_n$, ambient temperature, or other factors or conditions.

Similar to the equation above, the angular orientation of each solar module 12 in a series of parallel rows of solar modules 12 can be calculated based on a detected or calculated angular orientation of an adjacent row of solar modules 12, based on the detected angular orientation of one row of modules 12, with optional compensation for mechanical slop and/or thermal expansion, as follows:

$$\theta_p = \theta_1 + \Sigma_{i=2}^{p}(\theta_i - 1 * Gi * Mi * H),  \quad \text{Equation 8:}$$

where θ1 is a known sensor angle value, $^p$ is the panel row needed, $^n$ is the total panel rows, Gi is a non-uniformity linkage geometry factor, Mi is a non-uniformity mechanical slop factor, and H is a non-uniformity heat expansion factor, described above with reference to Equation 7.

With continued reference to FIG. 16, the westward-most pair 110 is also labeled with variables that can be used for determining whether or not one module, for example, a sunward module such as the module 112 during an afternoon, casts a shadow onto an adjacent module, such as the module 114 disposed on the eastward side of module 112. Such a calculation can be used to determine, for example, whether it is desirable to terminate forward tracking and initiate backtracking during afternoon operation. Although the calculation below is described with reference to the westward most pair 110 during afternoon operation, the calculation can also be performed on any desired pair, during any portion of a day, and on systems that have east side or west side drives.

The formula for calculating whether or not a solar module casts a shadow on an adjacent solar module, which can be performed using any of the calculated and/or compensated angular orientations of the modules explained above, is as follows:

$$x = \frac{[S-L]\sin\alpha}{\sin\beta_{n-1}} = \frac{[S - w\sin(180 - \alpha - \theta_n)]\sin\alpha}{\sin(180 - \alpha - \theta_{n-1})} \quad \text{Equation 9}$$

shading is imminent when X=W; shading occurs when X<W.

In FIG. 16, the length S is the spacing between rows of modules 12 (i.e., center to center spacing of piers 22) and W is half of the width of the modules 12. The length S and width W can be predetermined and stored in a memory device 214 or a hardware reference module 208 of the controller 50, described in greater detail below. In some embodiments, the controller 50 also includes a value indicative of the GCR of the system 10, which can optionally, be adjusted by a user.

In some embodiments, length S can be derived from the stored and/or adjusted GCR value by calculating an average gap between the rows of modules based on the GCR, the width W, and other dimensions of the system 10. In embodiments where length S is derived from the GCR value, increasing the value of the GCR has the effect of reducing the magnitude of the derived length S. Reducing the value of length S effects the shading calculation. In particular, decreasing the length S causes an X=W result to be produced later in the morning, thereby delaying the transition from backtracking to forward tracking in the morning. Additionally, a reduced S value will cause an X=W result to be produced earlier in the afternoon, thereby shifting the transition from forward tracking to back tracking, earlier afternoon. As such, back tracking is used for a greater amount of time during the day.

The equations set forth above with reference to FIG. 16, or other equations, can be utilized by the control unit 50 illustrated in FIG. 17 and/or during performance of the methods associated with the control routines illustrated in FIGS. 18-20, described below.

Figure 17:
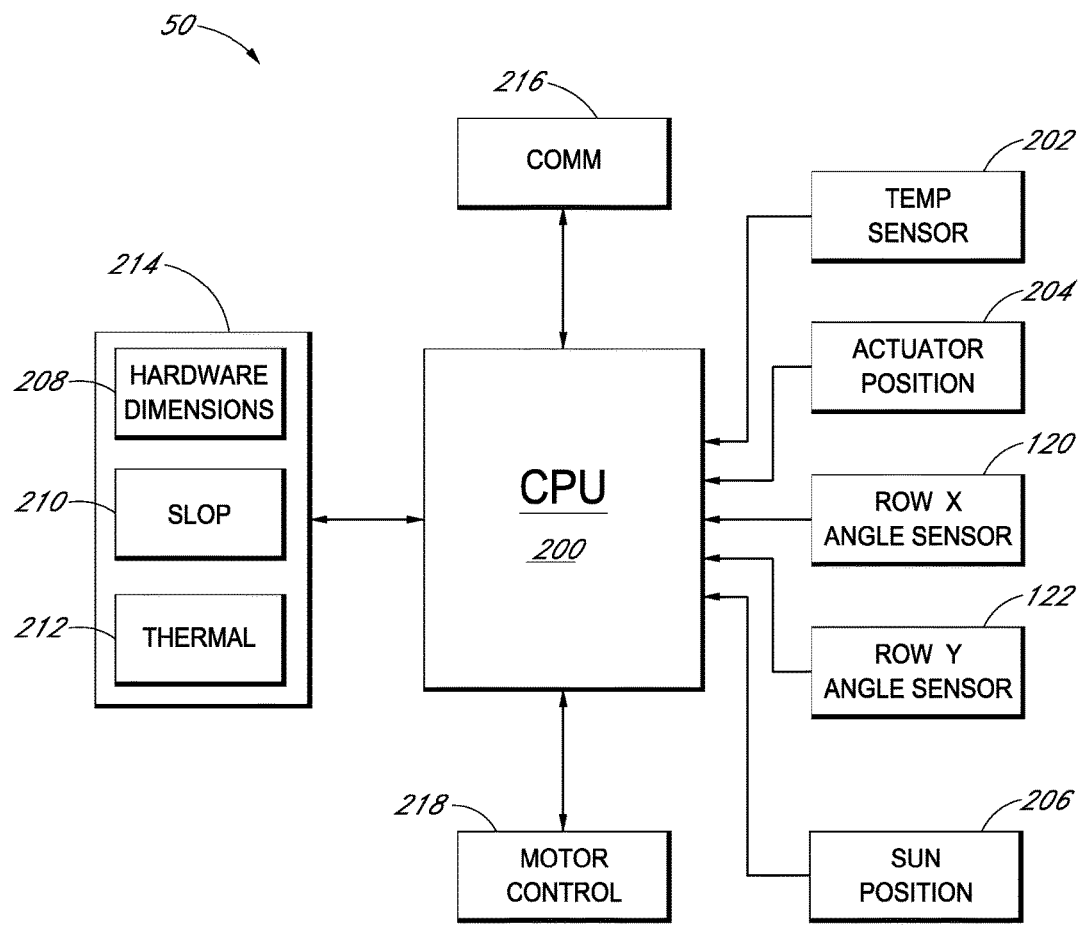
FIG. 17 is a schematic diagram of a control unit that can be combined and used with the systems illustrated in FIGS. 1-16.

With reference to FIG. 17, the control unit 50 can include a CPU 200, which can be in the form of a programmable logic controller or purpose-built computer processor, designed to provide the functions described below with regard to controlling an orientation of the drive 30. Alternatively, the CPU 200 can be in the form of a general-purpose processor, along with software providing an operating system for performing the functions noted above and described below. In other embodiments, the controller 50 can be in the form of a hardwired control system, in which the CPU 200 is in the form of a logical circuit, configured to provide the functions noted above and described below, or any other type of controller.

The controller 50 can include one or more temperature sensors 202. Such temperature sensors can be configured to detect a desired temperature, such as an ambient temperature, or surface or internal temperature of any desired component, or other temperatures. The temperature sensor 202 can be configured to generate and output a signal indicative of the detected temperature. Such temperature sensors are well known in the art and commercially available.

The controller 50 can also include an actuator position sensor 204. For example, the actuator position sensor 204 can be mounted to detect a position or orientation of an output member of the drive 30. The actuator position sensor 204 can be in the form of an angular orientation detector, linear orientation detector, or other type of sensors. The actuator position sensor 204 can be configured to output a signal indicative of a position of an output member of the drive 30.

The controller 50 can also include the first angle sensor 120 and 122 described above.

The controller 50 can also include a sun position module 206 configured to output an indication of the position of the sun 52. For example, the sun position module 206 can be in the form of an optical detector designed to detect a position of the sun in the sky and to output a signal indicative thereof. Alternatively, the sun position module 206 can be a look-up table including data indicating the position of the sun at any time or day during a solar year for the location of the system 10. Further alternatively, the sun position module 206 can be configured to receive a signal from another device, for example, over a data network, which indicates a real time position of the sun 52 or correction data for any such data described above. As such, the sun position module 206 can be configured to output a signal indicative of the position of the sun.

The controller 50 can also include one or more modules for providing fixed or dynamic data. For example, the controller 50 can include a dimensional module 208 configured for storing data corresponding to various dimensions of the system 10, such as, for example, the links of the drive strut 32 and its component link members 64, 66, 68, the width of solar modules 12, the spacing of solar modules 12, the ground coverage ratio (GCR) of the system 10, the number of rows in the system 10, the length of the torque arms 34, any dimensions required for execution of the formulas described above, or any other dimensions of any other component of the system 10.

The controller 50 can also include a mechanical slop reference module 210 which can include data indicating the magnitude of the mechanical slop associated with the connections 72, or other slop characteristics. Additionally, optionally, the mechanical slop module 210 can be configured to output values of mechanical slop which change over time, for example, increase in magnitude over time, so as to follow a likely increasing magnitude of the diameters of the holes 74, 76, 78 over time.

The controller 50 can also include a thermal reference module 212 which can include data corresponding to the behavior of components of the system with regard to changes in temperature. For example, the thermal reference module 212 can include coefficients of thermal expansion for various components of the system 10, for example, including the drive strut 32, the component drive link members 64, 66, 68, the torque arms 34, and other components.

The reference modules 208, 210, 212 can all be connected to the CPU 200 so that data from the module 208, 210, 212 can be utilized by the CPU 200 in performing calculations described above and below with reference to FIGS. 18-20. In some embodiments, the reference modules 208, 210, 212 are incorporated into a memory device 214 which can be any type of memory device, including generic random access memory or other types of memory. Additionally, the modules 208, 210, 212 can be accessible to allow users to change values stored in the modules 208, 210, 212. For example, the modules 208, 210, 212 or memory device 214 can communicate with other devices, for example, through the CPU 200 and a communication module 216. The communication module 216 can be any type of network data communication device. The steps of a method, process, or algorithm described in connection with the embodiments disclosed herein, including the control routines described below with reference to FIGS. 18-22 can also be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art.

The controller 50 can also include a motor controller 218 for controlling a motor which serves as an actuator included in the drive 30. Alternatively, the CPU 200 can be configured to provide or output the control data for motor controller 218 that is incorporated into an actuator of the drive 30. For example, in some embodiments, the CPU 200 can be configured to calculate angle to be used by the motor controller 218 as a target angle. The motor controller 218 can be configured to use the target angle received from the CPU 200 for feedback control of an actuator so as to, for example, move the drive strut 32 until a calculated or detected, selected feedback angle equals the target angle received from the CPU 200. For example, in some embodiments, the CPU 200 can issue a calculated target angle to the motor controller and also provide a feed of the output of any of the sensors 204, 120, 122 or other position sensors as a selected feedback angle. Other feedback control techniques can also be used.

Figure 18:
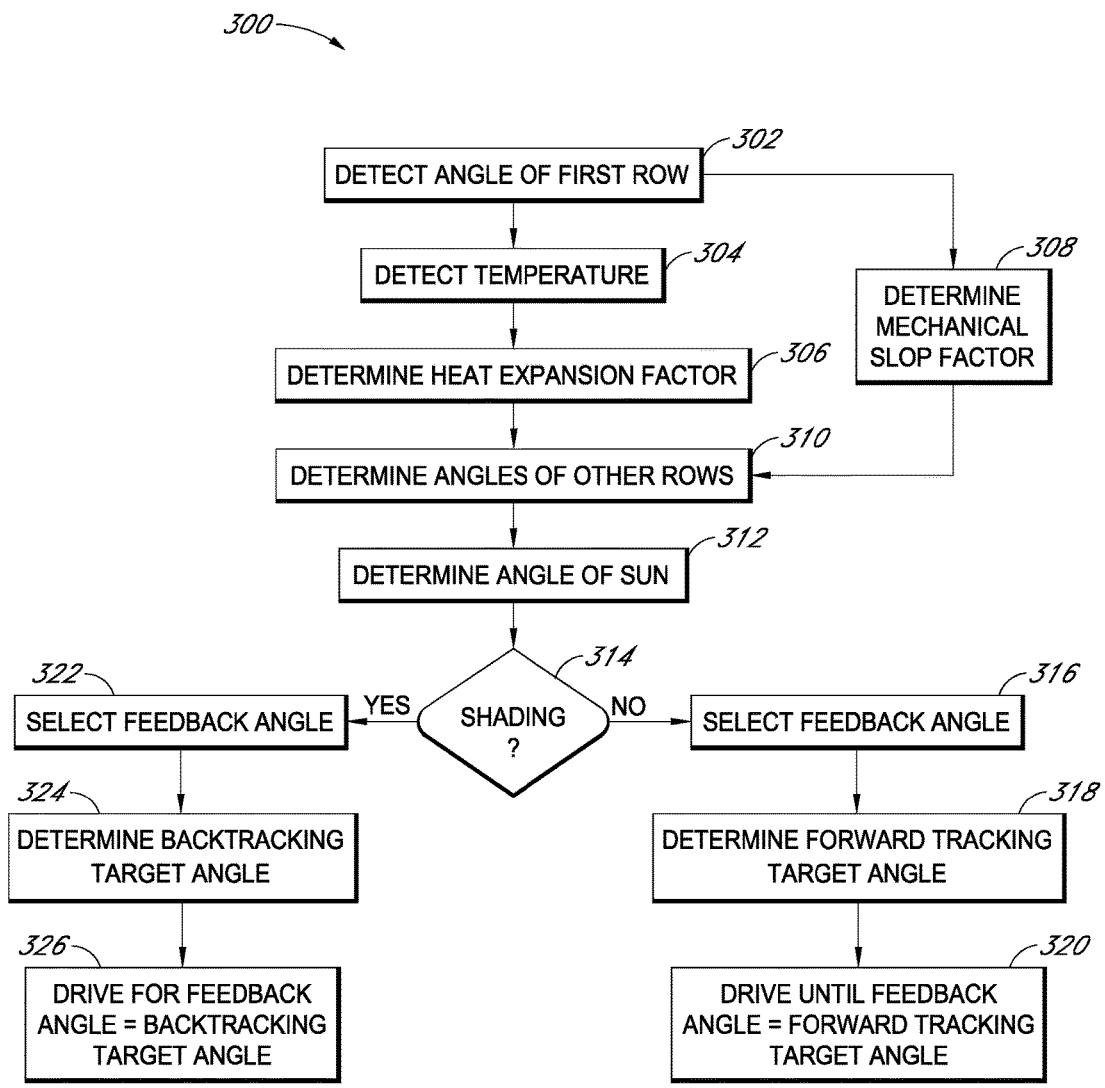
FIG. 18 is a flow chart illustrating embodiments of control routines that can be utilized by the controller of FIG. 17, the control routine including optional thermal expansion and optional mechanical slop compensation.

With reference to FIG. 18, the system 10 can be operated in accordance with a control routine 300. The control routine can be embodied in any form, including machine instructions executable by the CPU 200, such as computer readable media, and the like.

The control routine 300 can begin with an operation block 302 which can include detection of an angle of a first row of the system 10. For example, the CPU can read a detected angle from the position sensor 120, 122, 204, or another position sensor. After the operation block 302, the control routine 300 can move on to the operation block 304.

In the operation block 304, a temperature can be detected. For example, the CPU 200 can read the output of the temperature sensor 202, or another temperature sensor. Following the operation block 304, the control routine 300 can move on to operation block 306.

In the operation block 306, a heat expansion factor can be determined. For example, the CPU 200 can calculate thermal expansion magnitudes for any of the components of the system 10, for example, but without limitation, the length of the drive strut 32, the component link member 64, 66, 68, the length of the torque arms 34, or any other component by reading dimensional hardware data from the hardware dimension reference module 208 and by reading the relevant heat expansion data from the thermal reference module 212, and then execute the calculations described above with reference to FIGS. 9-13. After the operation block 306, the control routine can move on to an optional operation block 308.

In the operation block 308, the control routine 300 can determine a slop factor for any of the components of the system 10. For example, the CPU 200 can calculate magnitudes of deviation of the effective links of components of the system 10, based on mechanical slop and the connections between such components. Further, for example, the CPU 200 can read dimensional hardware from the hardware dimension reference module 208 and mechanical slop data from the mechanical slop reference module 210 and/or other sources of data and execute the calculations described above with reference to FIGS. 9-13. After the operation blocks 308, the control routine can move on to operation block 310.

In the operation block 310, the angular orientation of other rows of the system 10 can be calculated, for example, based on the detected angle of the first row obtained in operation block 302 and at least one of the dimensional variations resulting from thermal expansion determined in operation block 306 and the dimensional variations resulting from mechanical slop determined in operation block 308. For example, the CPU 200 can execute the equations described above with reference to FIGS. 9-13. After the operation block 310, the control routine 300 can move on to operation block 312.

In the operation block 312, the control routine can determine the angle of the sun. For example, the CPU 200 can read the output of the sun position module 206. After the operation block 312, the control routine can move on to decision block 314.

In the decision block 314, the control routine can determine whether or not any of the modules 12 in the system 10 are casting a shadow onto an adjacent module 14. For example, the CPU 200 can execute the equations set forth above described with reference to FIG. 16, based on the angle of the first row determined in operation block 302, the angular orientations of the remaining rows determined in operation block 310, the angle of the sun from operation block 312, and the other required dimensional data from the hardware dimension reference module 208. If it is determined in the operation decision block 314 that none of the modules are shading adjacent modules, the control routine can move on to operation block 316.

In the operation block 316, a feedback angle can be selected. For example, the CPU 200 can determine which of a plurality of detected or calculated angles can be used for feedback control. For example, the angles of any of the sensors 304, 120, 122 can be selected as the reference feedback angle. Other angles, detected or calculated, can also be used. After the operation block 316, the control routine 300 can move on to operation block 318.

In the operation block 318, a forward-tracking target angle can be determined. For example, the CPU 200 can calculate the angle of module 102 that would be perpendicular to sunlight 54 from the sun 52 and to output that target angle to the motor controller 218 and also to feed the output of sensor 120 to the motor controller 218 as the feedback angle. As such, the motor controller 218 will power the drive 30 so as to orient the module 102 as close as possible to perpendicular to the sunlight 54 from the sun 52.

However, depending on the time of day and temperature, such a control scenario may result in the system 10 outputting less power than possible.

Thus, optionally, in the operation block 318, the CPU 200 can calculate a target angle for the module 102 that is sub-optimal for generating the maximum power output from the module 102. For example, the CPU 200 can calculate the target angle for the module 102 that results in module 102 facing a direction easterly of the sunlight 54 from the sun 52 and the west-most module 122 facing a direction westerly of the sunlight 54 from the sun 52, based on the calculated angles of all of the other modules 12 determined in operation block 310. As such, the modules between module 102 and 112, depending on the magnitudes of the dimensional variations caused by thermal expansion and/or slop, will be directed in angles more optimal for maximum output from those modules as compared to the east-most module 102 and the west-most module 112. As such, the total output of the system 10 can be increased. After operation block 318, the control routine 300 can move on to operation block 320.

In the operation block 320, the drive 30 is operated until the selected feedback angle equals the forward-tracking target angle. For example, the CPU 200 can issue control signals to the motor controller 218, in a known manner.

If, in the decision block 314, it is determined that at least one module 14 is casting a shadow on an adjacent module, or such casting is imminent, e.g., when X=W in the formula described above with reference to FIG. 16, the control routine can move to operation block 322.

In the operation block 322, a feedback reference angle can be selected. For example, any of the detected angles from sensors 204, 120, 122, or other calculated angles, can be selected. After the operation block 322, the control routine can move on to operation block 324.

In the operation block 324, the control routine can determine a backtracking target angle. For example, the CPU 200 can execute the equations described above with reference to FIG. 16 such that the pair 110 which would be tilte so as to maintain the value X about equal to value W. For example, the equation for shading set forth above can be applied to every pair of the system 10 so that under no circumstance, is the value X less than W for any pair of modules 12. Alternatively, the equation for shading can be applied to only selected pairs of modules, such as those at the sunward side of the system. As such, the controller 50 can execute a backtracking procedure so as to reduce or prevent any of the modules 12 from casting shadows onto other modules 12, despite the effects of mechanical slop and/or thermal expansion. Although this may result in some modules 12 being tilted to substantially sub-optimal angles, such sub-optimal power output can be less detrimental to total power output of the system 10 than unintentional shading.

For example, when one of the modules 12 shades an adjacent module 14 with one or several inches of shadow, such a shadow can cease all power output from an entire row of modules 12. Such a sudden cessation of power output can present a far larger magnitude of reduction of total power output of the system 10 than that caused by rotation of modules to sub-optimal angles required to prevent any shading. After the operation block 324, the control routine 300 can move on to operation block 326.

In the operation block 326, the control routine 300 can drive the feedback angle selected in operation block 322 equals the backtracking target angle determined in operation block 324.

Figure 19:
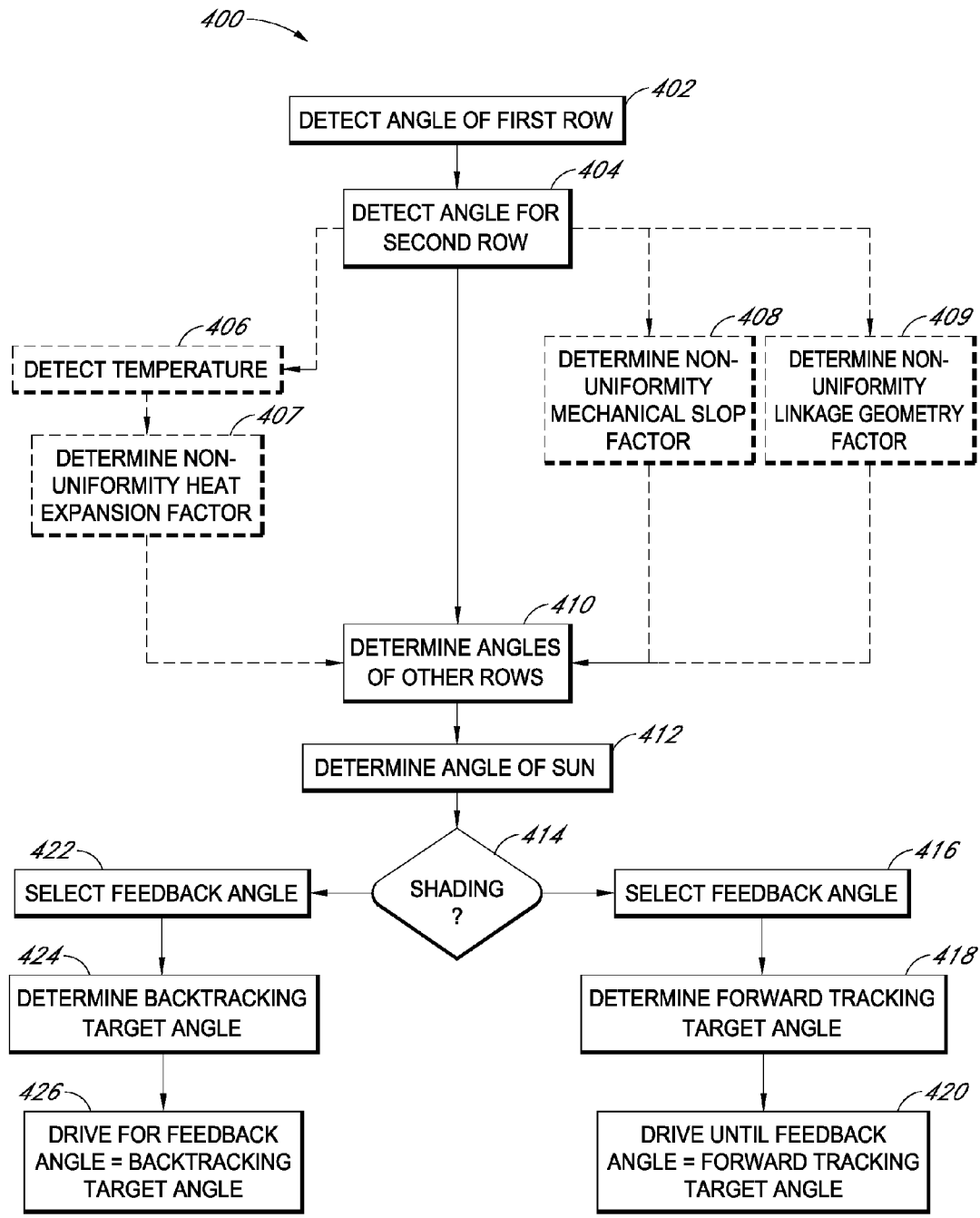
FIG. 19 illustrated embodiments of a control routine that can be utilized by the controller of FIG. 17 including the detection of a plurality of angular orientations and optional compensation for mechanical slop.

FIG. 19 illustrates a control routine 400 which can include several of the same operations described above with reference to control routine 300. Those operations which are the same as the control routine 300 will not be described again below. Those corresponding operation blocks are identified with the same reference numerals used for identifying operations in control routine 300, except that 100 has been added thereto.

The control routine 400 can include an operation block 404. In the operation block 404, a second angular orientation associated with the system 10 can be detected. For example, the CPU 200 can read the output from sensor 204 and/or 122, the output of sensor 120 having been read in operation block 402. After the operation block 404, the control routine can move on to operation block 410.

Optionally, the control routine can include operation block 406 in which a temperature associated with the system can be determined, operation block 407 in which a non-uniformity heat expansion factor H can be determined, an operation block 408 in which a non-uniformity mechanical slop factor M can be determined, and an operation block 409 in which a non-uniformity linkage geometry factor G can be determined. For example, such factors can be determined in accordance with the description of factors Gn Mn and H set forth above, with reference to Equations 7 and 8 and FIG. 16.

In the operation block 410, the angles of other rows of modules in the system 10 can be calculated, based on the values determined in operation blocks 402, 404, and optionally 406, 407, and/or 409. For example, the CPU 200 can execute the formulas set forth above with reference to FIG. 16, in which the angular orientation of the modules on adjacent rows of the system 10 are determined by the average deviation of the rows calculated based on the difference of the angular orientation values determined in operation blocks 402 and 404, and optionally the values determined in operation blocks 406, 407, and/or 409. With the determined angular orientations in operation block 410, the control routine 400 can continue in the manner described above with reference to control routine 300.

Additionally, with reference to operation blocks 416 and 422, the control routine 400 can select a feedback angle, optionally, based on the determination of which detected angle is larger, either the value from operation block 402 or the value from operation block 404. Other angles can also be chosen.

Figure 20:
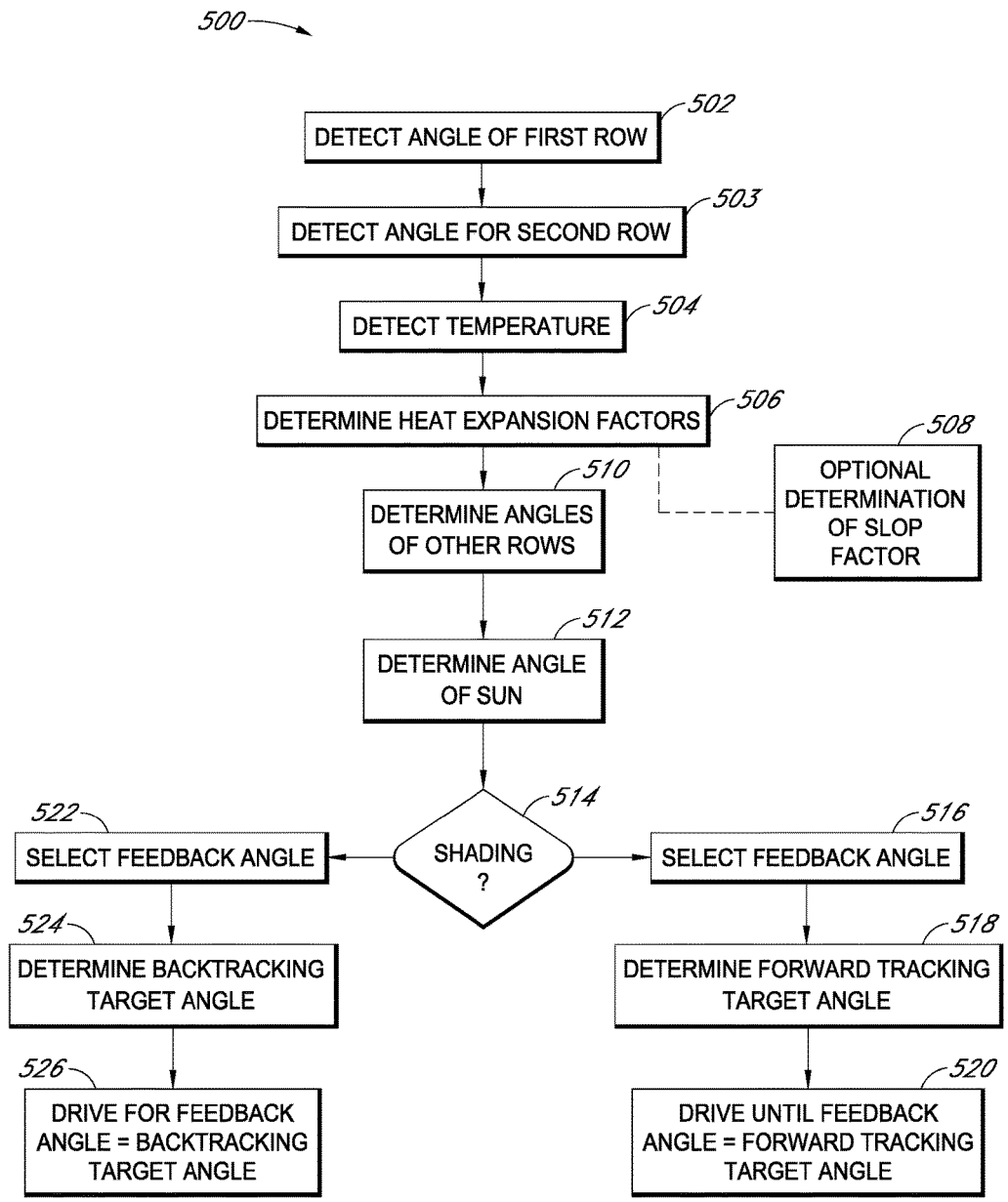
FIG. 20 is a flow chart illustrating embodiments of a control routine which can be utilized by the control unit of FIG. 17 and which includes plural angular detection, optional thermal expansion detection and compensation, and optional mechanical slop compensation.

FIG. 20 illustrates a control routine 500, which is similar to control routine 400, but includes the optional combination of thermal expansion determinations with the detection of two angles and the optional combination with slop factor determination.

Figure 21:
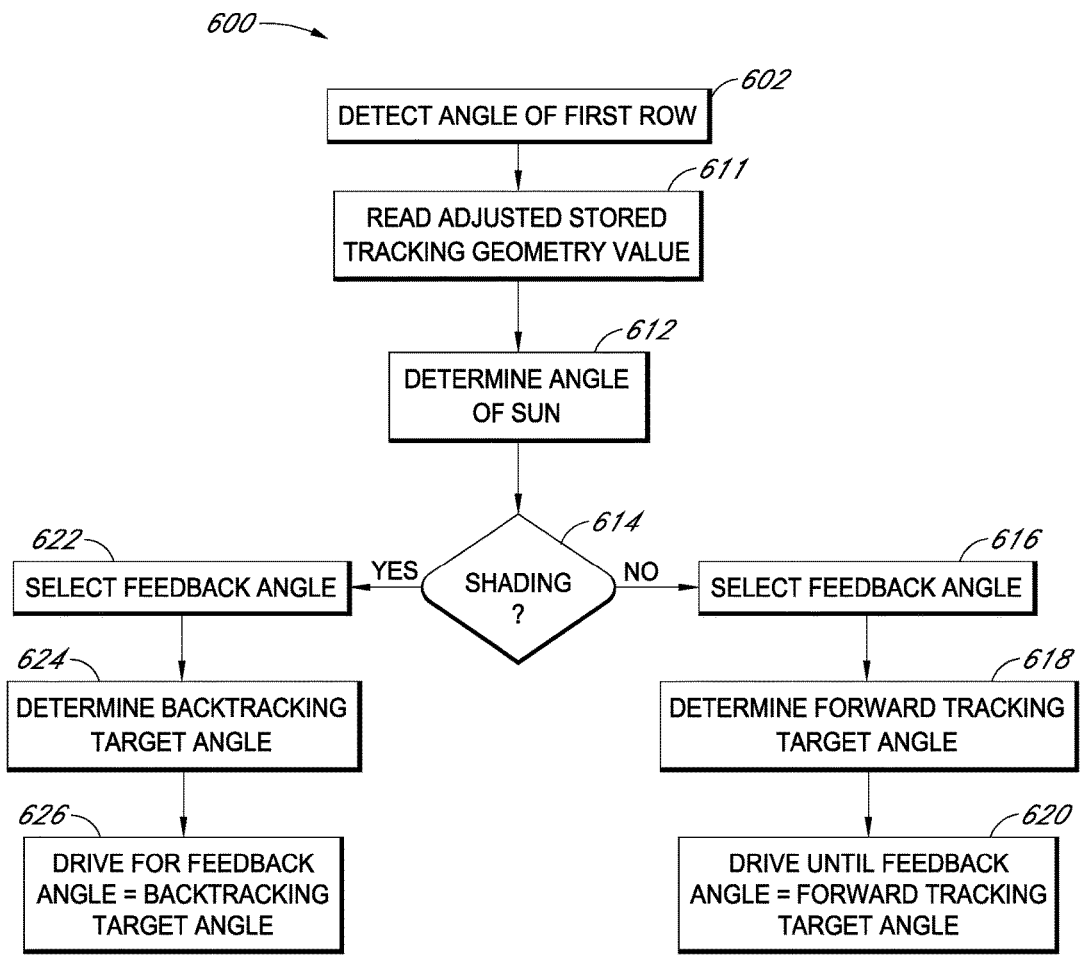
FIG. 21 is a flowchart illustrating another control routine that can be utilized by the controller of FIG. 17.

With reference to FIG. 21, a control routine 600 can include many of the same operation and decision blocks as control routine 300 of FIG. 18, with optional modifications explained below.

With continued reference to FIG. 21, the control routine 600 can include an operation block 611, in which an adjusted stored tracking geometry value can be read. For example, in some embodiments, an adjusted stored tracking geometry value can be a value indicative of the length "S" of FIG. 16, or another value that affects and can change a determination whether a module 14 is casting a shadow on an adjacent module 14.

As noted above, with reference to FIG. 16, the value "S" can be stored in the hardware dimension reference module 208 of FIG. 17, and can be utilized by the CPU 200 during calculations for determining whether or not shading occurs. Although the length "S" of a particular system 10 would not change over time because the rows of modules 12 are typically are fixed to the ground, the value of "S" stored in the module 208 can be changed by a user. If a user increases the value of "S," for example, to a value greater than the actual length between rows of a system 10, the value of "X" will be greater. As such, the time of day in the afternoon when the determination of the value of "X" is equal to or less than "W," be at a later time in the day. On the other hand, the opposite occurs if the value of "S" is reduced.

In some systems, the hardware dimension module 208 includes a stored value for the "Ground Coverage Ratio" (GCR). Higher GCR values correspond to smaller values of "S," and lower GCR values correspond to higher values of "S." Thus, in some embodiments, a stored tracking geometry value, such as the length "S" or the GCR of an associated system 10, can be adjusted so as to change the timing at which backtracking begins or is terminated, without calculating thermal expansion or mechanical slop compensated values of the angles of each of the modules 12 of the system 10. Rather, the shading determination in operation block 614 can use the shading equation described above with reference to FIG. 16 using only the single angle determined in operation block 602, and an adjusted stored tracking geometry value in operation block 611. As such, optionally, the detected angle of the first row of operation block 602 can be selected as a feedback angle in both operation block 622 and 616.

Optionally, a control routine 700 can be incorporated into the control routine 600 as a subroutine, can operate independently as a control routine executed by the CPU 200, or can be executed on a separate system and provide outputs and adjustments described below, through the communication module 216 (FIG. 17).

Figure 22:
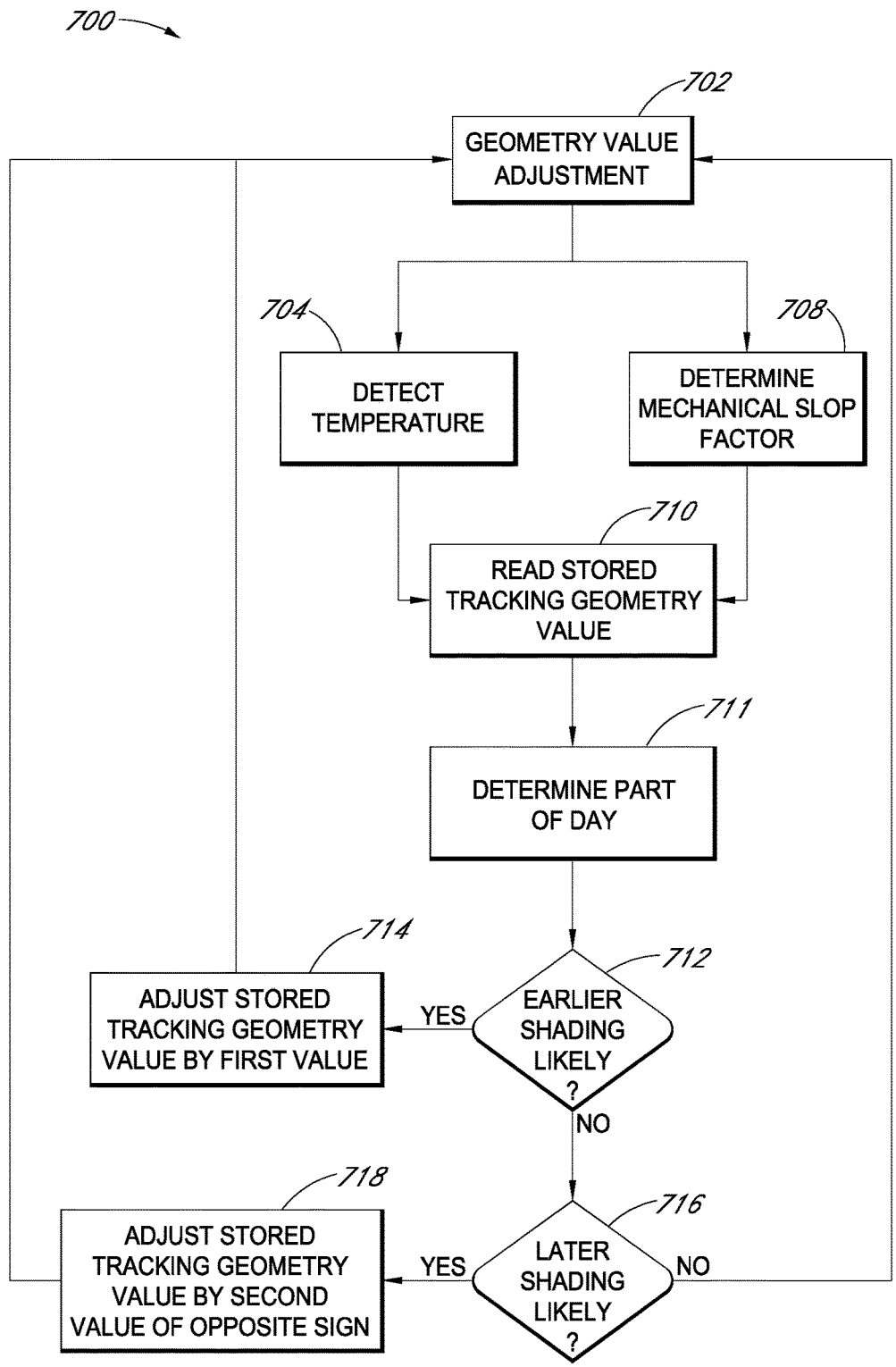
FIG. 22 is a flowchart illustrating another embodiment of a control routine that can be utilized by the controller of FIG. 17.

With reference to FIG. 22, the control routine 700 can provide functionality for adjusting a geometry tracking value utilized by the CPU 200 for the shading determination executed in decision block 614. Beginning with operation block 702, the control routine 700 can optionally move on to an operation block 704.

In the operation block 704, a temperature associated with the system 10 can be determined. For example, the output of the temperature sensor 202 can be read, a temperature can be read from an outside source, such as a local weather service, or from another source. Additionally, optionally, the control routine can include operation block 708.

In the operation block 708, a determination of a mechanical slop factor can be determined. The mechanical slop factor determined in operation block 708 can be determined from a lookup table including data representing the mechanical slop of the system 10, a value input by the user, and can include data that changes over time, for example, mechanical slop magnitudes that are larger for later points in time, thus correlating to a typical or estimated increase in mechanical slop of the system 10 over time. After the operation block 702, and/or the optional operation block 704, 708, the control routine 700 can move on to operation block 710.

In the operation block 710, a stored tracking geometry value can be read. For example, a tracking geometry value, such as the length "S" described above with reference to FIG. 1, a GCR, or another value can be read which is utilized by the CPU 200 for the shading determination of operation block 614, which affects the timing at which a shading determination changes between affirmative and negative results. Additionally, in operation block 710, an actual tracking geometry value of the system 10 can also be read, for example, from a separate memory location of the module 208 or the memory 214 of FIG. 17. The actual tracking geometry value is intended to correspond to an actual value of the length "S" or the GCR, or another value, that is not adjusted by the control routine 700.

Optionally, the control routine can include operation block 711. In the operation block 711, it can be determined whether it is morning or afternoon. For example, in the operation block 711, a time of day can be read from a clock, an indication of time of day can be provided by an outside source, or any other technique can be used.

The time of day can be used in the decision blocks 712, 716, described below, to determine whether or not earlier or later shading is likely.

For example, a system 10 can include an east-side mounted drive 30 with an angle sensor 120 configured to detect an angle of the row closest to the drive 30 (the eastward-most row), and can be designed with the intent such that all of the rows are directed to the same angle at a reference ambient temperature, ignoring for example mechanical slop. When such a system is subjected to a high temperature (relative to the reference ambient temperature) sufficient to cause a large thermal expansion during the afternoon, the row closest to the drive 30 will be positioned at the largest angle (relative to directly upward) of all of the rows. This is because the thermal expansion of the drive strut 32, accumulating along the length of the drive strut 2, will cause the westward rows to be tilted at smaller angles than the first row. Thus, in such a scenario, in the operation block 716, it would be determined that later shading is likely in the afternoon, and thus, smaller or the actual tracking geometry values can be used and the first and second rows will be the first rows to generate inter row shading.

However, when such a system 10 is subject to high temperature in the morning, the westward-most rows will be tilted to larger angles than the eastward-most rows, due to the accumulating effect of the thermal expansion of the drive strut 32. As such, the determination in decision block 712 would be affirmative earlier in the morning hours, causing the control routine 700 to adjust the stored tracking geometry value to cause more backtracking during the morning by delaying the transition from backtracking to forward tracking. Thus, the control routine 700 can be executed multiple times during the day so as to advance or delay the termination or initiation of backtracking multiple times per day. For example, when the system 10 is subject to a large thermal expansion, the control routine 700 would adjust the tracking geometry value so as to cause to the control routine 600 to utilize backtracking earlier in the morning, and then the control routine 700 can readjust the tracking geometry value, for example, restoring the adjusted stored tracking geometry value to the actual GCR value of the system 10, during afternoon operation, depending on whether the drive 30 is positioned on the east or west side of the system 10.

After the operation block 711, the control routine 700 can move on to decision block 712.

In the decision block 712, it can be determined whether or not later shading in the morning or earlier shading in the afternoon is likely. For example, the magnitude of the temperature detected in operation block 704, the magnitude of the mechanical slop factor of 708, the time of day (e.g., morning or afternoon), the position of the sun, whether the drive 30 is on the east or west side of the system 10, whether or not the mechanical slop and thermal expansion associated with the temperature detected in operation block 704 are additive or subtractive, and/or other values, can be compared to threshold values which would indicate that later inter-row shading in the morning or earlier inter row shading in the afternoon is likely to occur.

For example, a high temperature detected in the operation block 704 during the afternoon can cause sufficient thermal expansion in a system 10, having a west mounted drive, such that one or more of the rows of a system 10 would be tilted to angles of the greater magnitude relative to the angle of the first row (e.g., where the first row, the angle of which is detected in operation block 602, is adjacent to the drive 30, with the remaining rows disposed at increasing distances from the drive 30), thereby causing inter-row shading at earlier times of the afternoon than the first row. If it is determined, in the decision block 712, that earlier shading in the afternoon or later shading in the morning is likely, the control routine 700 can move on to operation block 714.

In the operation block 714, the stored tracking geometry value can be adjusted by a first value. For example, the length "S" stored in hardware dimension module 208 can be decreased, or alternatively, a GCR value stored in the module 208 can be increased for a system 10 with a drive 30 positioned on the west side of system 10, during the afternoon. Either of these adjustments would cause the shading determination in operation block 614 to indicate shading is occurring later in the morning and earlier in in the afternoon, i.e., at smaller detected angular orientations of the module 14 closest to the drive 30. Thus, the shading determination of the operation block 614 would be affirmative for greater portions of a solar day, thereby causing the controller 50 to execute backtracking during larger portions of the day which would therefore reduce or eliminate inter row shading.

If in the decision block 712, it is determined that later shading in the morning or earlier shading in the afternoon is not likely, the control routine 700 can move on to decision block 716.

In the decision block 716, it can be determined whether earlier shading in the morning or later shading in the afternoon is likely. For example, using the parameters utilized in decision block 712, it can be determined if certain magnitudes cross thresholds that would indicate that inter-row shading would cease earlier in the morning or begin later in the afternoon.

For example, if the temperature detected in the operation block 704 indicates a very low temperature during the afternoon of a system with a west side-mounted drive 30, resulting in thermal contraction of the drive strut 32 at such a magnitude sufficient to overcome all effects of any mechanical slop or any other effects, it can be determined that based on the stored tracking geometry value read in operation block 710, having been previously changed to increase the use of backtracking, later shading is likely, and thus the control routine 700 moves to operation block 718.

In the operation block 718, the value of the stored tracking geometry value can be adjusted by a second value that is the opposite sign of the first value utilized in operation block 714. Thus, for example, if in operation block 714, the length "S" was adjusted downwardly, or a GCR value was adjusted upwardly, the opposite adjustments can be made in operation block 718. For example, in operation block 718, the value of length "S" can be increased or the GCR value can be decreased.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method of operating a solar energy collection system, the method comprising:
    detecting a first operational parameter of the solar energy collection system, the first operational parameter being a first angle of inclination of a first array of solar collection devices;
    detecting a second operational parameter of the solar energy collection system, the second operational parameter being a second angle of inclination of a second array of solar collection devices;
    determining a target angle for directing the first and second solar arrays toward the sun based on a current position of the sun;
    determining a corrected target angle by compensating for differences in angles of inclination of the first and second arrays caused by thermal expansion of first and second linkages connecting a tilt drive device with the first and second arrays, respectively; and
    operating a tilt drive device to tilt the first array of solar collection devices and the second array of solar collection devices to track movement of the sun based on the corrected target angle.

2. The method according to claim 1, wherein determining the corrected target angle comprises determining a corrected target angle for the first solar array that is different than an angle at which the first solar array would produce a maximum amount of electrical energy.

3. The method according to claim 1, wherein determining the corrected target angle comprises determining a corrected target angle at which the second solar array is tilted to an angle different than an angle at which the second solar array would produce a maximum amount of electrical energy.

4. The method according to claim 1, further comprising:
determining when inter-row shading of the first and second arrays is imminent based on the detected first and second operation parameters.

5. The method according to claim 4, wherein operating the tilt drive device comprises operating the tilt drive device to move the first and second arrays through a forward tracking movement when inter-row shading is not occurring or imminent based on the determination of when inter-row shading of the first and second arrays is imminent and operating the tilt drive device to move the first and second arrays through a backtracking movement when inter-row shading is occurring or imminent based on the determination of when inter-row shading of the first and second arrays is imminent.

6. A method of operating a solar energy collection system, the method comprising:
detecting a first operational parameter of the solar energy collection system, the first operational parameter being a first angle of inclination of a first array of solar collection devices;
detecting a second operational parameter of the solar energy collection system, the second operational parameter being an ambient atmospheric temperature in a vicinity of the solar energy collection system;
determining a target angle for directing the first and second solar arrays toward the sun based on a current position of the sun;
determining a corrected target angle by compensating for differences in angles of inclination of the first and second arrays caused by thermal expansion of first and second linkages connecting a tilt drive device with the first and second arrays, respectively; and
operating the tilt drive device to tilt the first array of solar collection devices and the second array of solar collection devices to track movement of the sun based on the corrected target angle.

7. The method according to claim 6, wherein determining the corrected target angle comprises determining a corrected target angle for the first solar array that is different than an angle at which the first solar array would produce a maximum amount of electrical energy.

8. The method according to claim 6, wherein determining the corrected target angle comprises determining a corrected target angle at which the second solar array is tilted to an angle different than an angle at which the second solar array would produce a maximum amount of electrical energy.

9. The method according to claim 6, further comprising:
determining when inter-row shading of the first and second arrays is imminent based on the detected first and second operation parameters.

10. The method according to claim 9, wherein operating the tilt drive device comprises operating the tilt drive device to move the first and second arrays through a forward tracking movement when inter-row shading is not occurring or imminent based on the determination of when inter-row shading of the first and second arrays is imminent and operating the tilt drive device to move the first and second arrays through a backtracking movement when inter-row shading is occurring or imminent based on the determination of when inter-row shading of the first and second arrays is imminent.

* * * * *